US012671534B2

(12) United States Patent (10) Patent No.: US 12,671,534 B2
Duan et al. (45) Date of Patent: Jun. 30, 2026

(54) SYSTEMS AND TECHNIQUES FOR SECURE POSITIONING SIGNALING

(71) Applicant: QUALCOMM Incorporated, San Diego, CA (US)

(72) Inventors: Weimin Duan, San Diego, CA (US); Lianghai Ji, San Diego, CA (US); Huilin Xu, Temecula, CA (US); Liangping Ma, San Diego, CA (US); Mehmet Izzet Gurelli, San Diego, CA (US); Qiang Wu, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 861 days.

(21) Appl. No.: 17/691,799

(22) Filed: Mar. 10, 2022

(65) Prior Publication Data

US 2023/0291519 A1 Sep. 14, 2023

(51) Int. Cl.
 *H04L 5/00* (2006.01)
(52) U.S. Cl.
 CPC ................................ *H04L 5/0048* (2013.01)
(58) Field of Classification Search
 CPC .............. H04L 5/0048; H04B 7/18543; H04B 7/18556; H04B 7/18552; H04W 64/006
 See application file for complete search history.

(56) References Cited

U.S. PATENT DOCUMENTS

| | | | | |
|---|---|---|---|---|
| 11,665,748 B2* | 5/2023 | Hosseinian | ....... | H04W 74/0841 |
| | | | | 370/329 |
| 2013/0336094 A1* | 12/2013 | Gruteser | ................. | G01S 11/14 |
| | | | | 367/117 |
| 2019/0363843 A1* | 11/2019 | Gordaychik | ........ | H04W 72/044 |
| 2020/0267683 A1* | 8/2020 | Edge | ..................... | G01S 13/767 |
| 2021/0297147 A1* | 9/2021 | Qaise | ................... | H04W 84/06 |

(Continued)

FOREIGN PATENT DOCUMENTS

| | | |
|---|---|---|
| WO | 2021142604 A1 | 7/2021 |
| WO | 2021155582 A1 | 8/2021 |

OTHER PUBLICATIONS

Emara Soha: "Master's Thesis Positioning in Non-Terrestrial Networks", MSc thesis, Jun. 28, 2021, Lund, Sweden, XP093041956, pp. 1-50, section 1-5, figures 2-9.

(Continued)

*Primary Examiner* — Khaled M Kassim
*Assistant Examiner* — Christopher A. Reyes
(74) *Attorney, Agent, or Firm* — QUALCOMM Incorporated

(57) ABSTRACT

Systems and techniques are provided for wireless communications at a network entity. For example, then systems and techniques can include determining, at the network entity, a transmission timing compensation between a first reference signal and a second reference signal. The first reference signal can be transmitted using a first communication link. The second reference signal can be transmitted based on an offset determined based on the transmission timing compensation, wherein the second reference signal is transmitted suing a second communication link. The offset can be used to offset transmission of the second reference signal from transmission of the first reference signal.

26 Claims, 13 Drawing Sheets

(56)     References Cited

U.S. PATENT DOCUMENTS

| | | | |
|---|---|---|---|
| 2022/0015058 A1* | 1/2022 | Li | G01S 5/0236 |
| 2022/0018927 A1* | 1/2022 | Wigard | G01S 5/0036 |
| 2022/0030638 A1* | 1/2022 | Hosseinian | H04W 74/0841 |
| 2022/0053436 A1* | 2/2022 | Sosnin | H04W 56/007 |
| 2022/0070811 A1* | 3/2022 | Tripathi | H04B 7/1851 |
| 2022/0264257 A1* | 8/2022 | Hofmann | G01S 5/0072 |
| 2022/0317230 A1* | 10/2022 | Manolakos | H04L 27/2602 |
| 2023/0107781 A1* | 4/2023 | Medeiros De Amorim | H04W 74/002 |
| | | | 370/350 |
| 2023/0291468 A1* | 9/2023 | Duan | H04W 56/0065 |
| 2023/0291519 A1* | 9/2023 | Duan | H04L 5/0048 |
| 2023/0408706 A1* | 12/2023 | Rusek | G01S 19/38 |

OTHER PUBLICATIONS

International Search Report and Written Opinion—PCT/US2023/062429—ISA/EPO—May 9, 2023.

* cited by examiner

250

270           272

LMF             SLP

260

266

5GC

AMF      SMF      UPF 264                  262

265     265     263     263

220

NEW RAN 224     ng-eNB         gNB     222

223

204

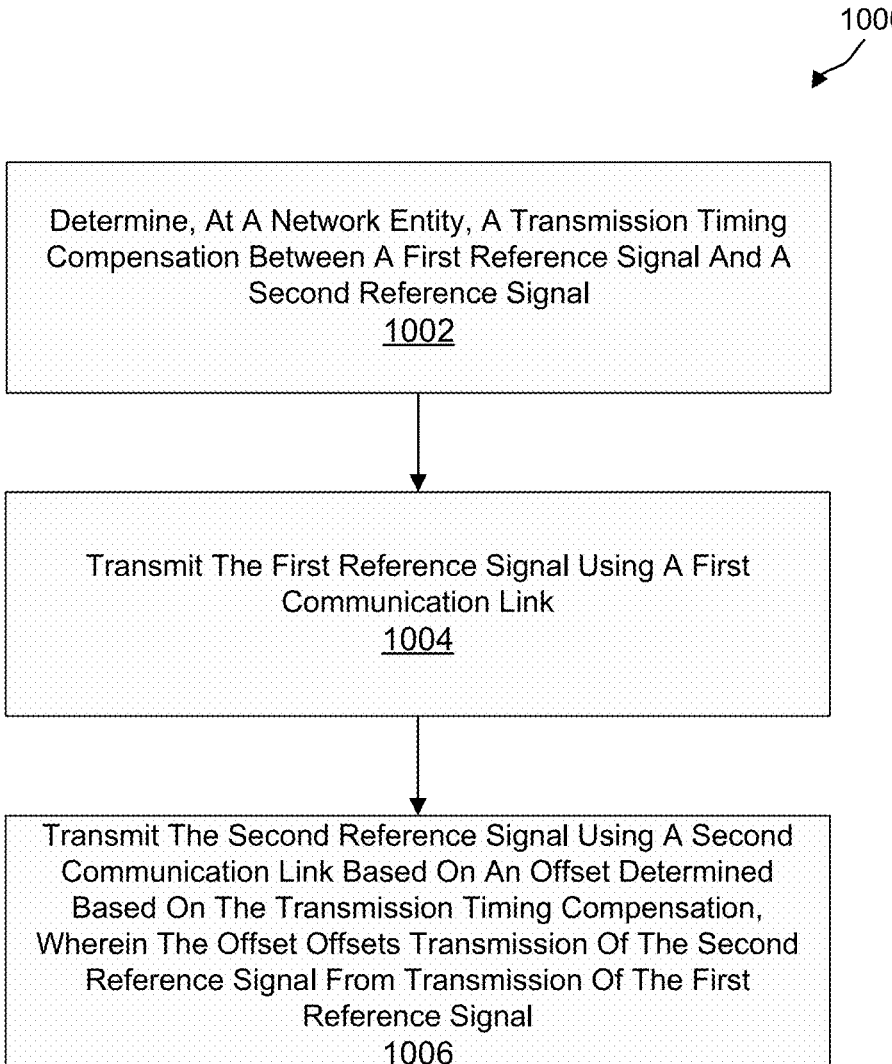

1000

Determine, At A Network Entity, A Transmission Timing Compensation Between A First Reference Signal And A Second Reference Signal
1002

Transmit The First Reference Signal Using A First Communication Link
1004

Transmit The Second Reference Signal Using A Second Communication Link Based On An Offset Determined Based On The Transmission Timing Compensation, Wherein The Offset Offsets Transmission Of The Second Reference Signal From Transmission Of The First Reference Signal
1006

FIG. 10

SYSTEMS AND TECHNIQUES FOR SECURE POSITIONING SIGNALING

FIELD

The present disclosure generally relates to positioning of devices. For example, aspects of the present disclosure are related to providing secure position-based signaling (e.g., in a non-terrestrial network (NTN) or other network) without indicating a location of a network device.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users with, for example, a gigabit connection speeds to tens of users in a common location, such as on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

BRIEF SUMMARY

In some examples, systems and techniques are described for secure position-based signaling (e.g., in an NTN or other network) without indicating a location of a network device. According to at least one illustrative example, a method for wireless communications performed at a network entity is provided. The method includes: determining, at the network entity, a transmission timing compensation between a first reference signal and a second reference signal; transmitting the first reference signal using a first communication link; and transmitting, based on an offset determined based on the transmission timing compensation, the second reference signal using a second communication link, wherein the offset offsets transmission of the second reference signal from transmission of the first reference signal.

In another example, an apparatus for wireless communications is provided that includes at least one memory (e.g., configured to store data, such as virtual content data, one or more images, etc.) and at least one processor (e.g., implemented in circuitry) coupled to the at least one memory. The at least one processor is configured to and can: determine, at a network entity, a transmission timing compensation between a first reference signal and a second reference signal; transmit the first reference signal using a first communication link; and transmit, based on an offset determined based on the transmission timing compensation, the second reference signal using a second communication link, wherein the offset offsets transmission of the second reference signal from transmission of the first reference signal.

In another example, a non-transitory computer-readable medium is provided that has stored thereon instructions that, when executed by one or more processors, cause the one or more processors to: determine, at a network entity, a transmission timing compensation between a first reference signal and a second reference signal; transmit the first reference signal using a first communication link; and transmit, based on an offset determined based on the transmission timing compensation, the second reference signal using a second communication link, wherein the offset offsets transmission of the second reference signal from transmission of the first reference signal.

In another example, an apparatus for wireless communications performed at a network entity is provided. The apparatus includes: means for determining, at the network entity, a transmission timing compensation between a first reference signal and a second reference signal; means for transmitting the first reference signal using a first communication link; and means for transmitting, based on an offset determined based on the transmission timing compensation, the second reference signal using a second communication link, wherein the offset offsets transmission of the second reference signal from transmission of the first reference signal.

In some aspects, one or more of the methods, apparatuses, and computer-readable medium described above further comprise: determining the transmission timing compensation between the first reference signal and the second reference signal by determining a relative propagation time difference between the first communication link and the second communication link.

In some aspects, one or more of the methods, apparatuses, and computer-readable medium described above further comprise: determining, at the network entity, the relative propagation time difference between the first communication link and the second communication link in response to receiving a transmission timing full compensation request from an additional network entity.

In some aspects, one or more of the methods, apparatuses, and computer-readable medium described above further comprise: determining a distance associated with the first communication link using a location of a first non-terrestrial network (NTN) transceiver associated with the first communication link; determining a distance associated with the second communication link using a location of a second NTN transceiver associated with the second communication link; and determining the relative propagation time difference based on the distance associated with the first communication link and the distance associated with the second communication link.

In some aspects, one or more of the methods, apparatuses, and computer-readable medium described above further comprise: transmitting assistance data, wherein: the assistance data does not include relative time difference (RTD) information for the first reference signal and the second reference signal; or the assistance data includes RTD information for the first reference signal and the second reference signal having a value of zero.

In some aspects, one or more of the methods, apparatuses, and computer-readable medium described above further comprise determining the transmission timing compensation between the first reference signal and the second reference signal by: obtaining a target relative time difference (RTD) between the first reference signal and the second reference signal; and determining the transmission timing compensation between the first reference signal and the second reference signal based on the target RTD.

In some aspects, one or more of the methods, apparatuses, and computer-readable medium described above further comprise obtaining the target RTD between the first reference signal and the second reference signal by: determining, at the network entity, a random RTD between the first reference signal and the second reference signal.

In some aspects, one or more of the methods, apparatuses, and computer-readable medium described above further comprise: determining, at the network entity, the random RTD between the first reference signal and the second reference signal in response to receiving a transmission timing partial compensation request; and transmitting the random RTD between the first reference signal and the second reference signal.

In some aspects, one or more of the methods, apparatuses, and computer-readable medium described above further comprise: transmitting assistance data including the random RTD between the first reference signal and the second reference signal.

In some aspects, one or more of the methods, apparatuses, and computer-readable medium described above further comprise obtaining the target RTD between the first reference signal and the second reference signal by: obtaining, at the network entity, a random RTD between the first reference signal and the second reference signal from an additional network entity.

In some aspects, at least one of the first reference signal and the second reference signal is a positioning reference signal (PRS).

In some aspects, the network entity is a base station or a gateway and the additional network entity is a location server.

In some aspects, the first NTN transceiver and the second NTN transceiver are satellites; and one or more of the location of the first NTN transceiver and the location of the second NTN transceiver is determined based on ephemeris information of the satellites.

In some aspects, the random RTD between the first reference signal and the second reference signal is obtained in a transmission timing partial compensation request received from the additional network entity.

In some aspects, the network entity comprises a non-terrestrial network (NTN) gateway or a base station.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

4

Figure 1:
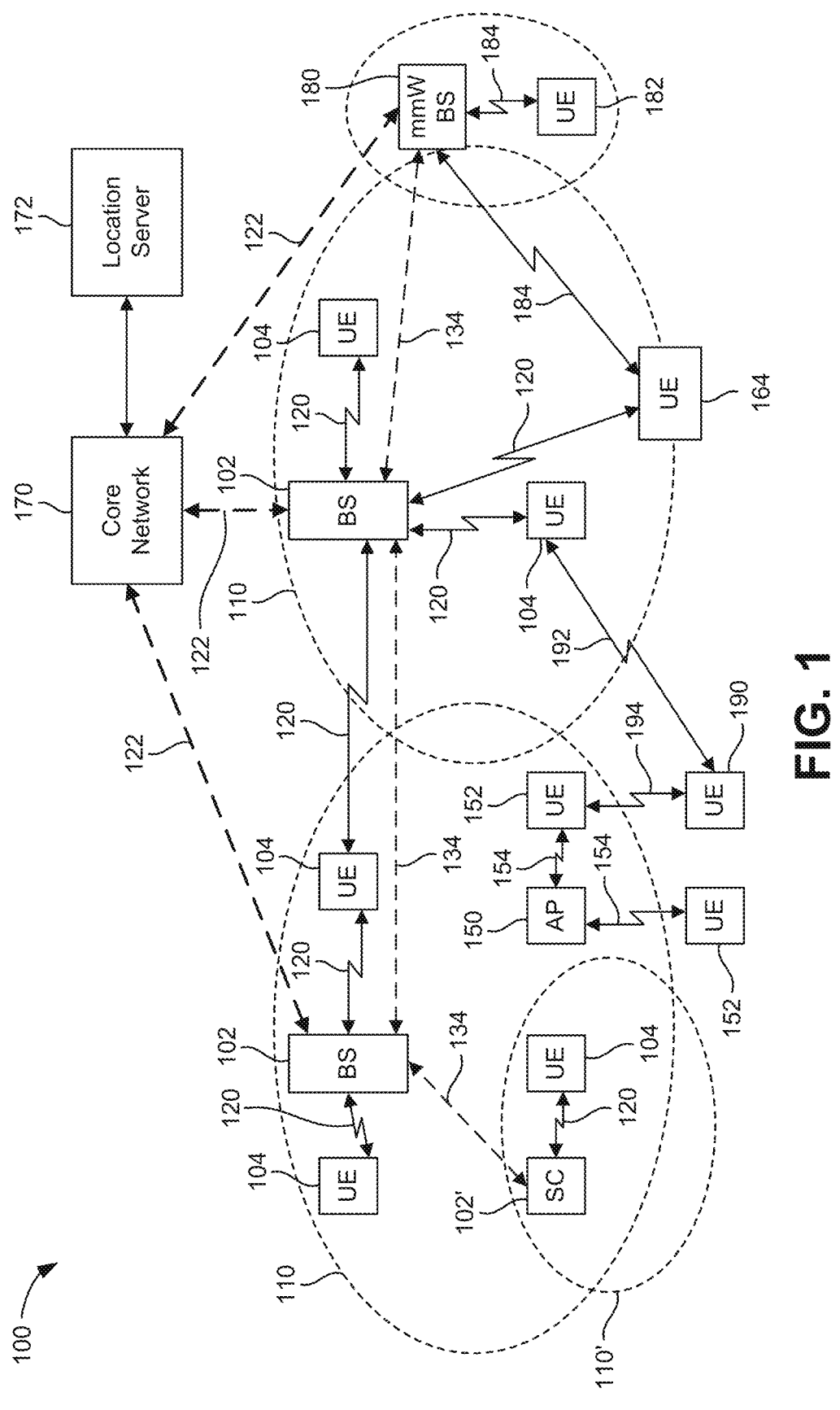
Figure 2A:
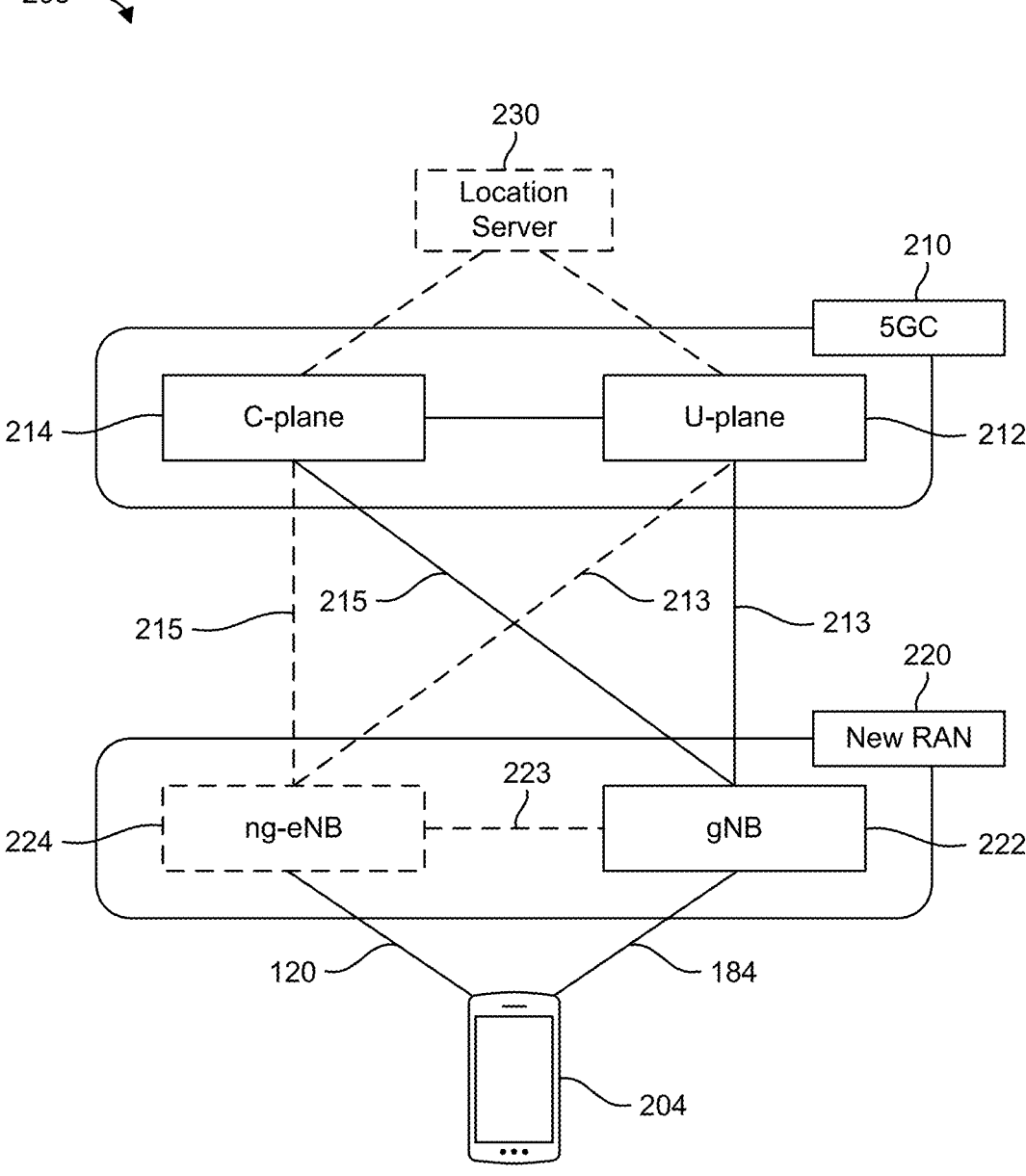
Figure 2B:
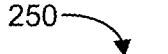
Figure 3:
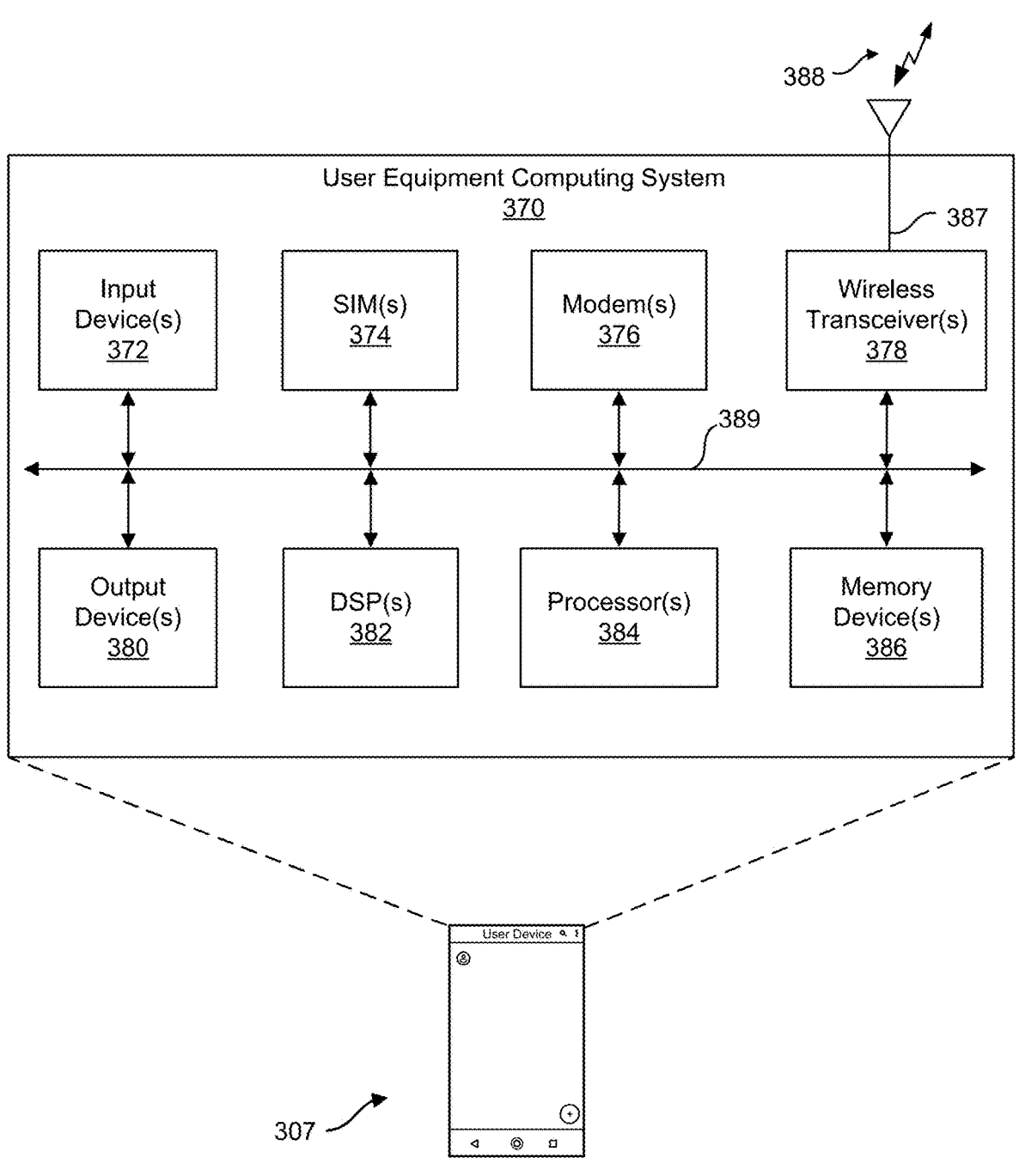
Figure 4:
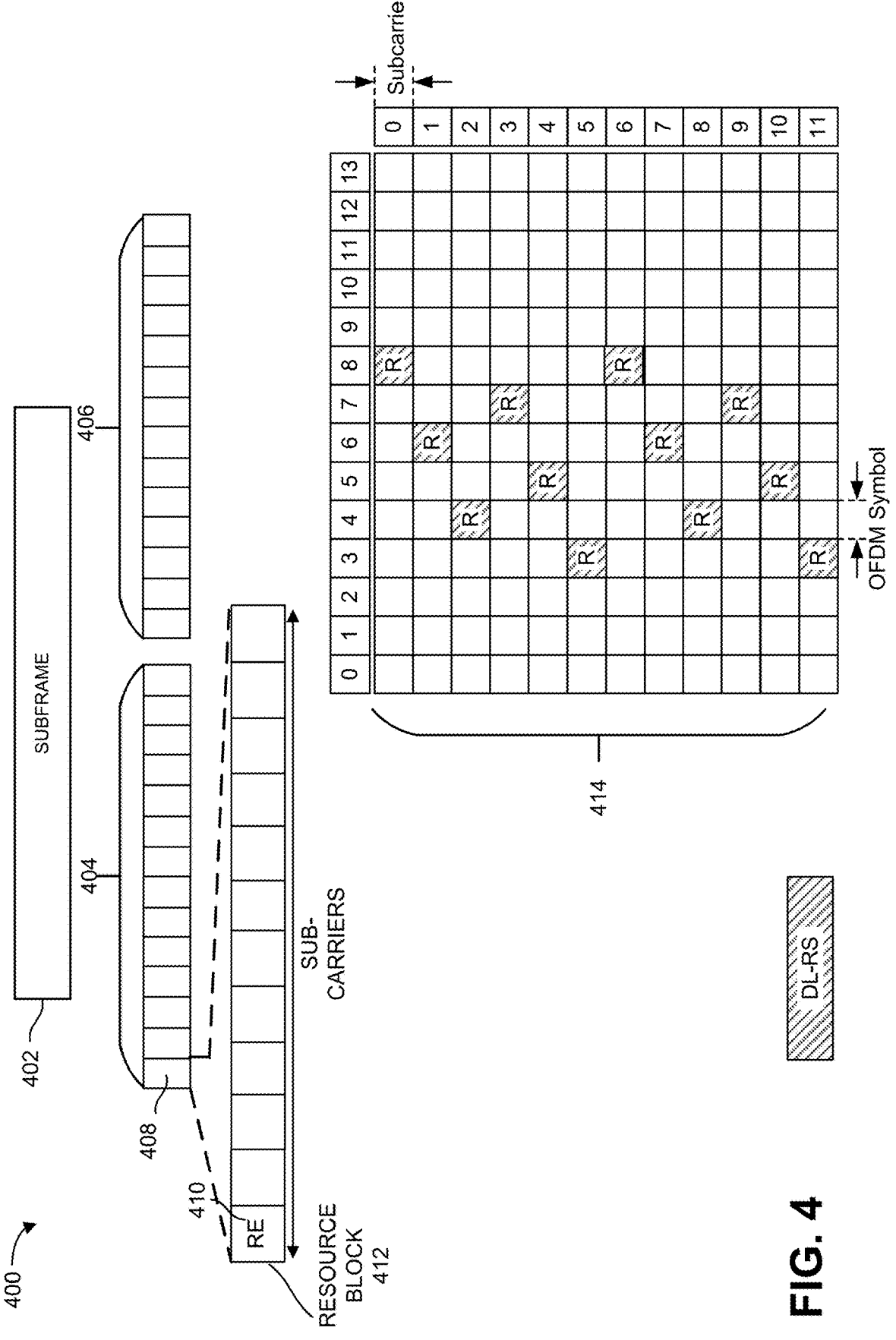
Figure 6:
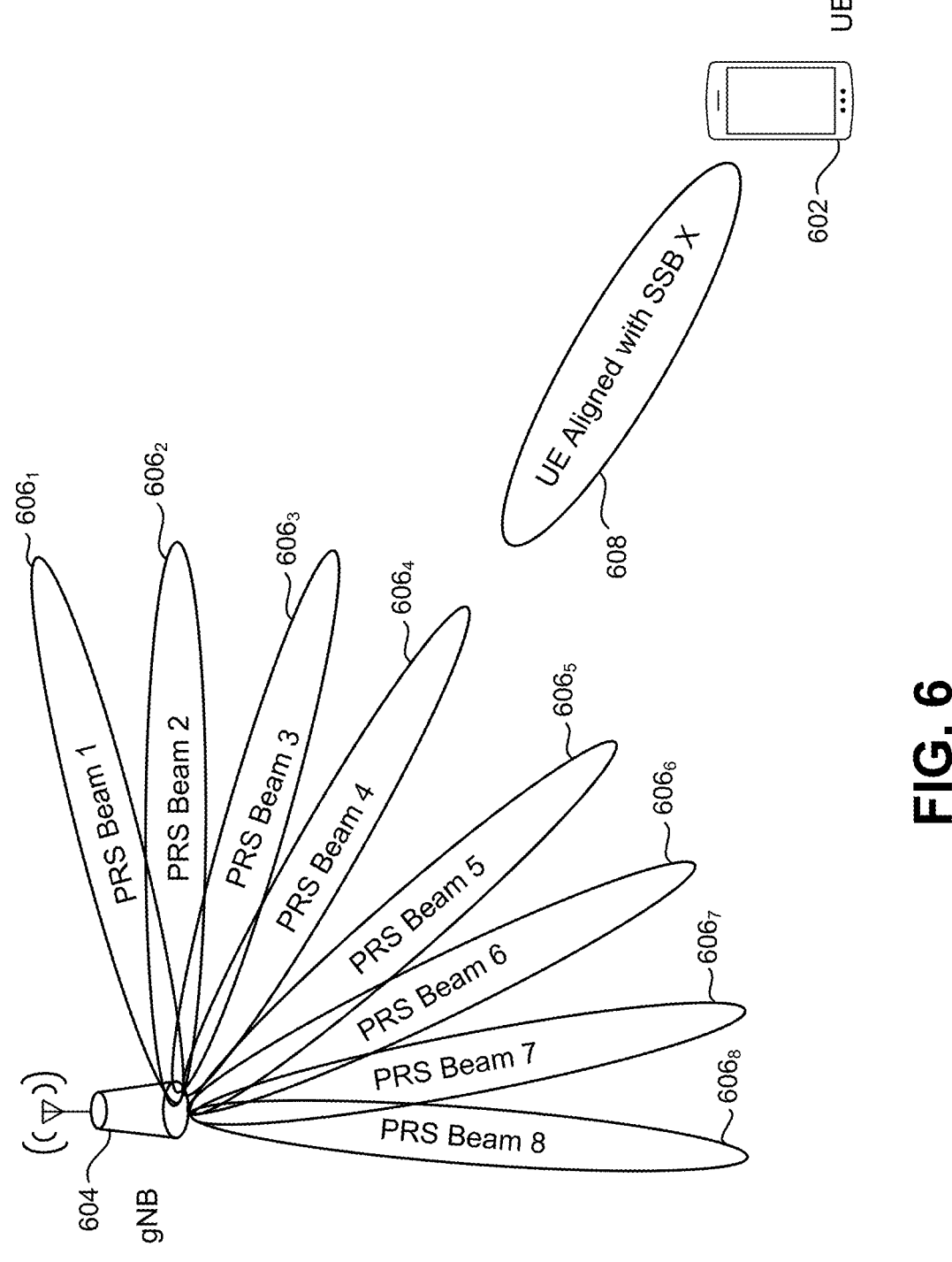
Figure 7:
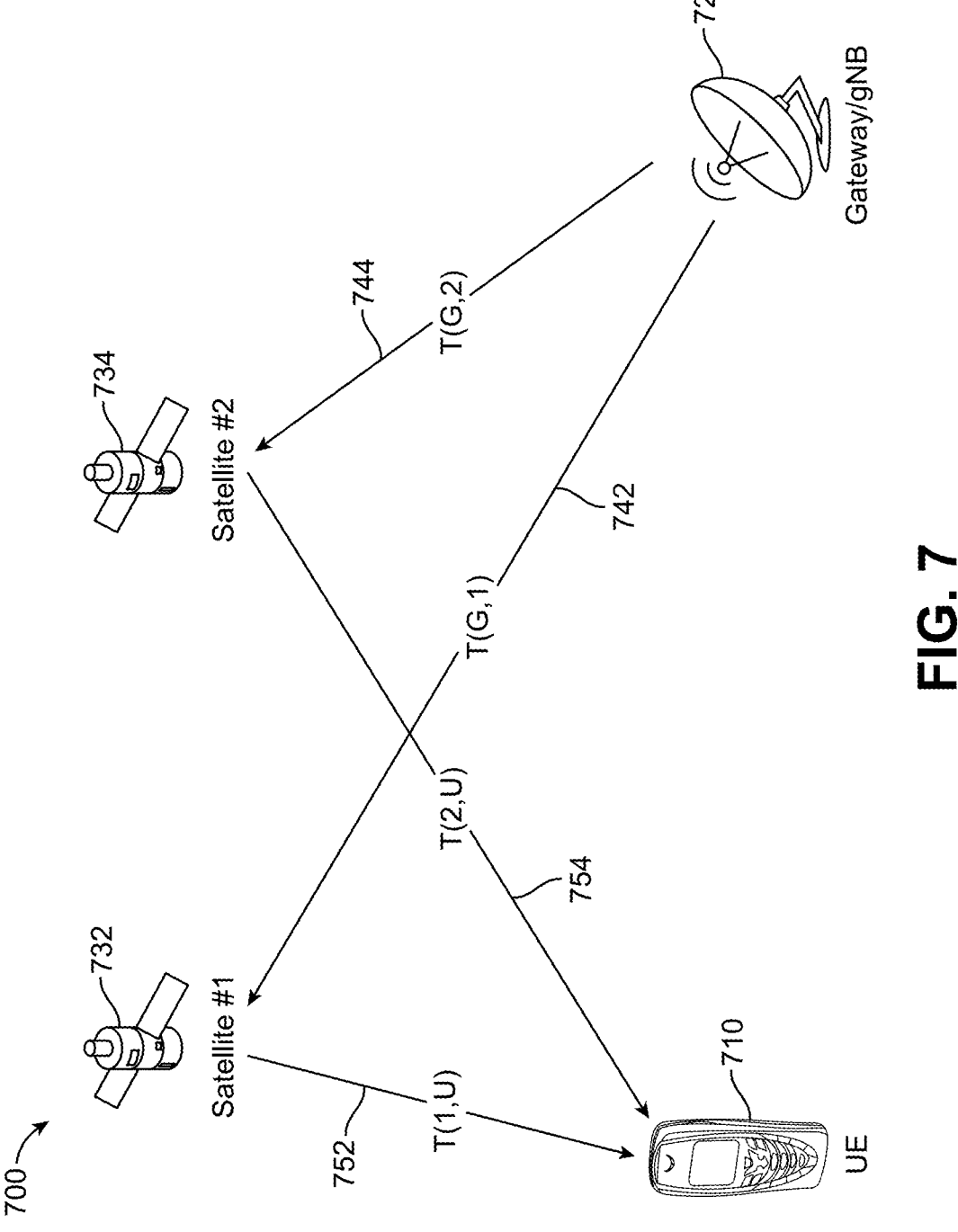
Figure 8:
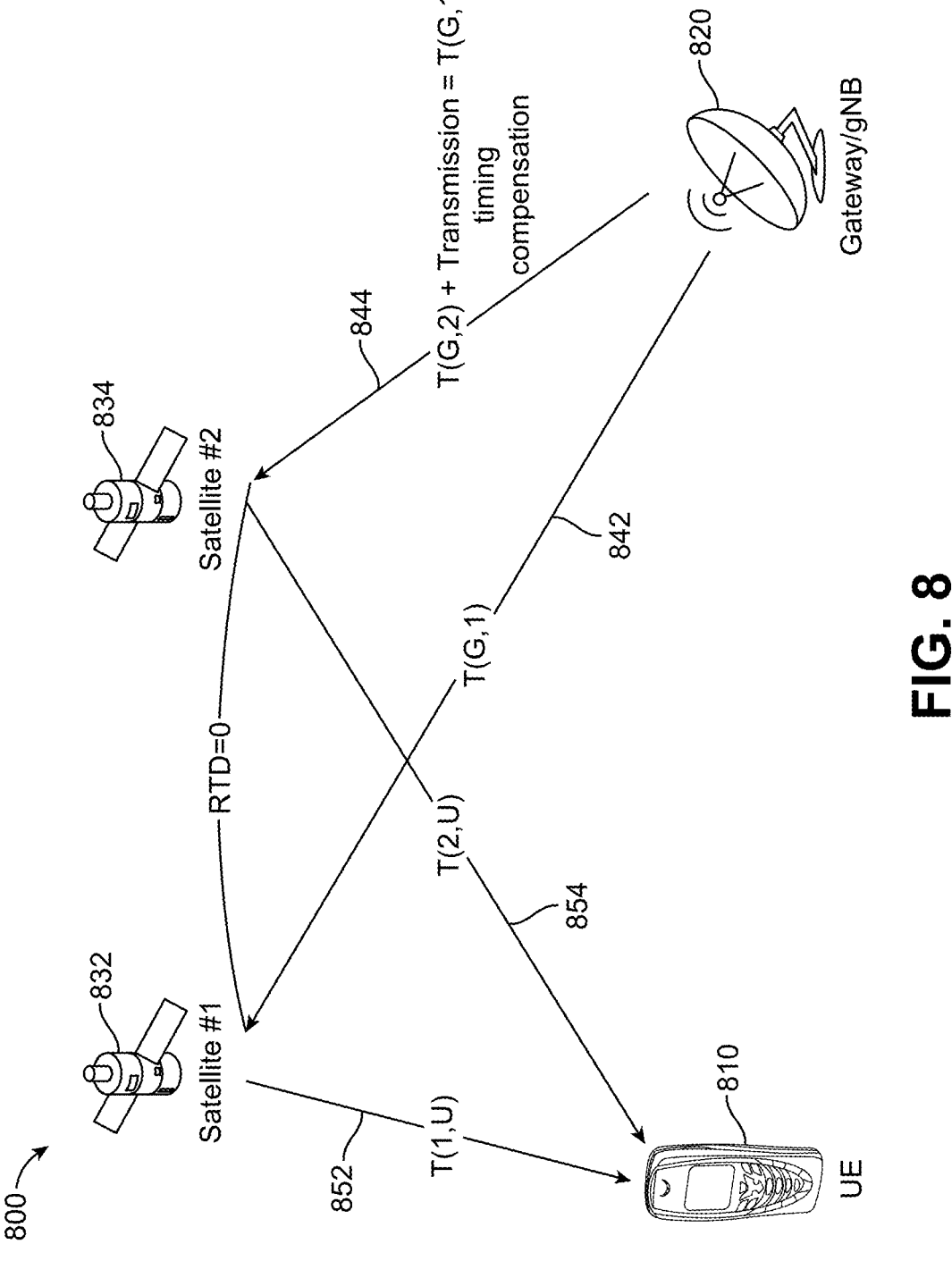
Figure 9A:
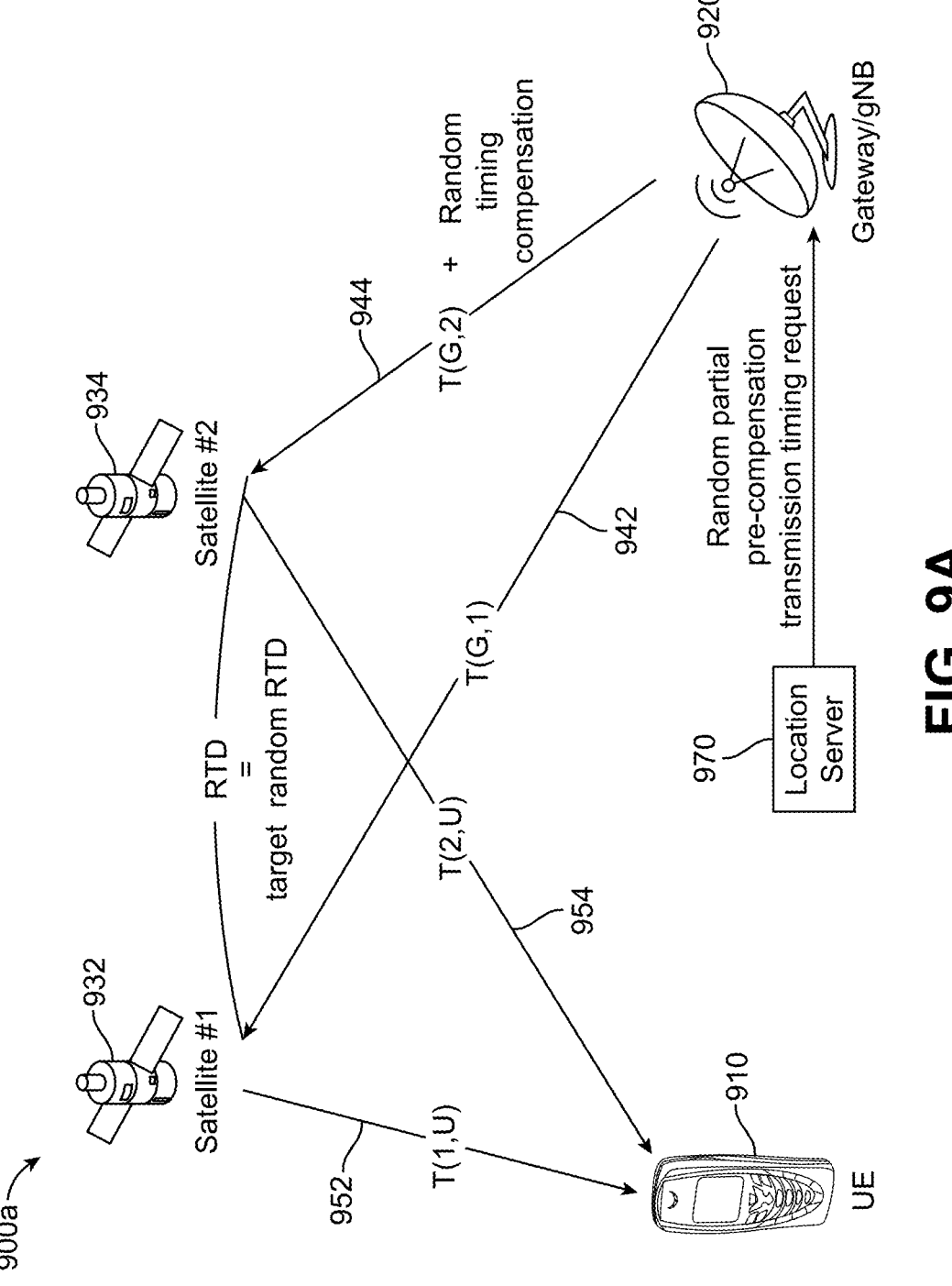
Figure 9B:
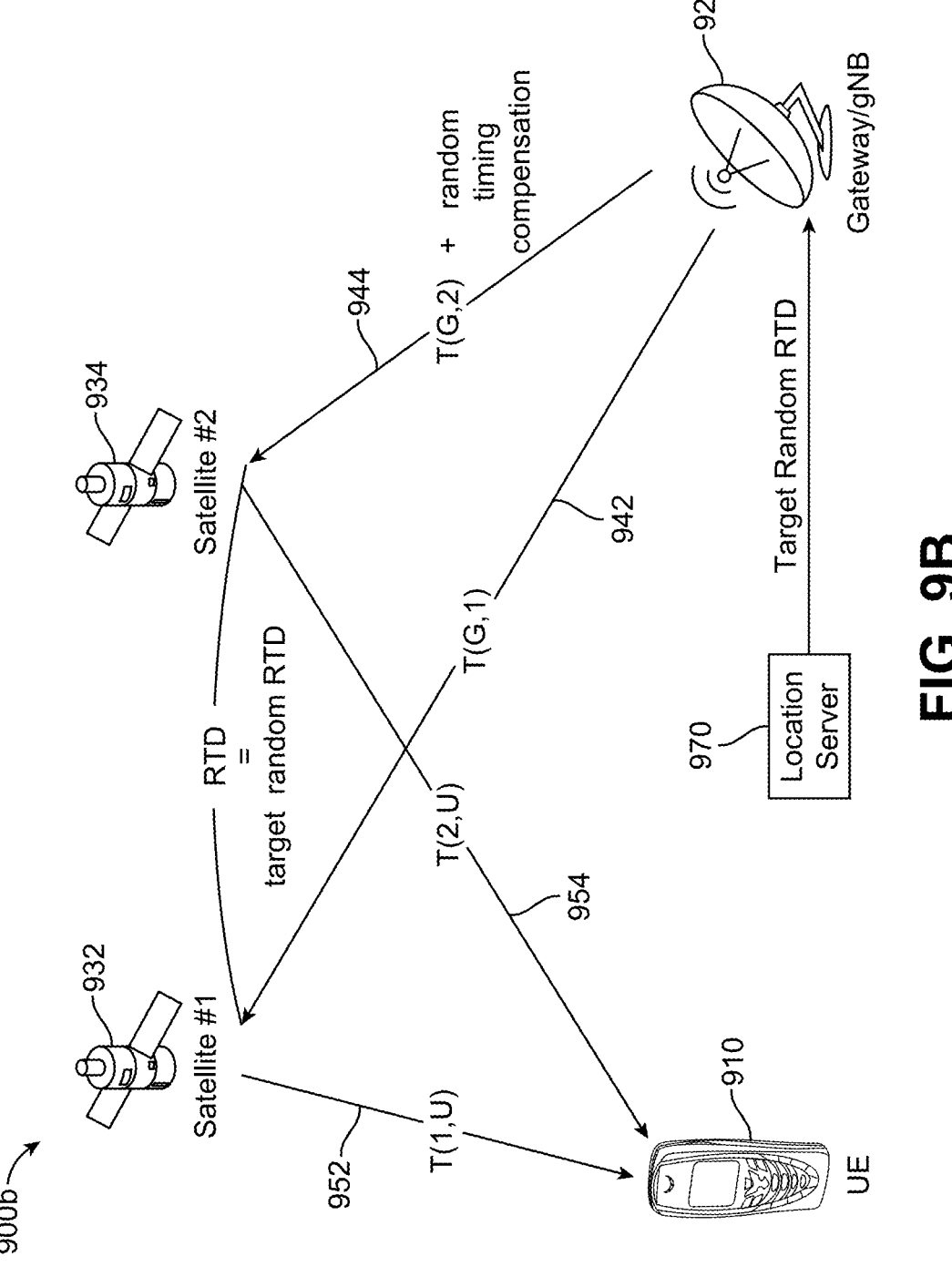
Figure 11:
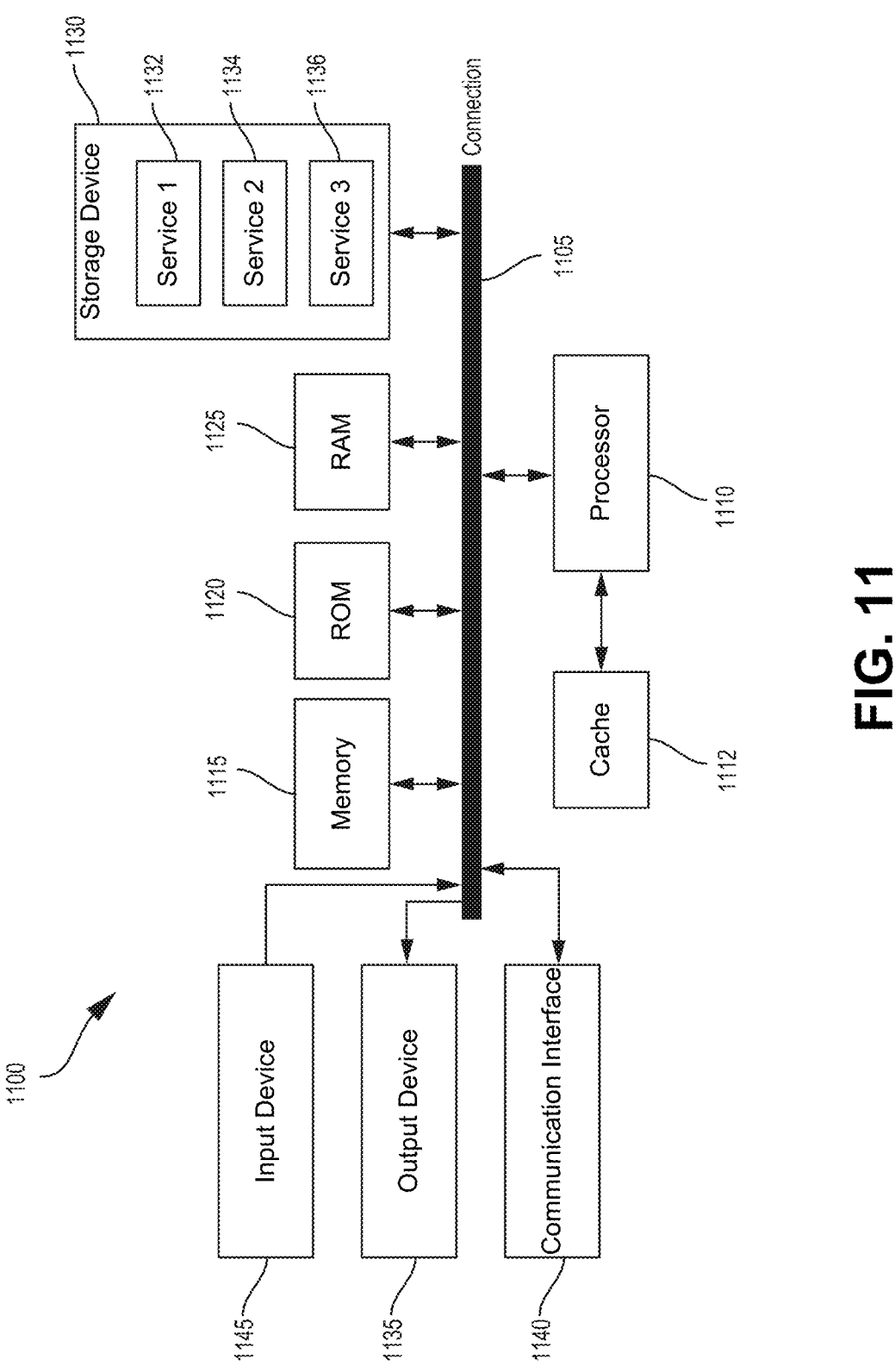

FIG. 1 illustrates an example wireless communications system, in accordance with some examples of the present disclosure;

FIGS. 2A and 2B illustrate example wireless network structures, in accordance with some examples of the present disclosure;

FIG. 3 illustrates an example block diagram of a computing system of a user equipment (UE) device, in accordance with some examples of the present disclosure;

FIG. 4 illustrates an example diagram of a frame structure, in accordance with some examples of the present disclosure;

FIGS. 5A-5H illustrate example charts of comb-symbol patterns, in accordance with some examples of the present disclosure;

FIG. 6 illustrates an example diagram of the communication of positioning reference signal (PRS) resource sets between a next generation NodeB ("gNB") and a user equipment (UE) device, in accordance with some examples of the present disclosure;

FIG. 7 illustrates an example wireless communications system for transmitting one or more reference signals, in accordance with some examples of the present disclosure;

FIG. 8 illustrates an example wireless communications system for transmitting one or more reference signals with a full transmission timing compensation, in accordance with some examples of the present disclosure;

FIG. 9A illustrates an example wireless communications system for transmitting one or more reference signals with a partial transmission timing compensation, in accordance with some examples of the present disclosure;

FIG. 9B illustrates another example wireless communications system for transmitting one or more reference signals with a partial transmission timing compensation, in accordance with some examples of the present disclosure;

FIG. 10 is a flow diagram illustrating an example of a process for wireless communications performed at a network entity, in accordance with some examples of the present disclosure; and FIG. 11 is a block diagram illustrating an example of a computing system for implementing certain aspects described herein.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Wireless communication networks are deployed to provide various communication services, such as voice, video, packet data, messaging, broadcast, and the like. A wireless communication network may also provide location related services for wireless devices that are associated with the network. Location related services provided by a wireless network can be used for a great variety of applications that can include indoor positioning, automotive applications (e.g., vehicular to everything "V2X" applications), autonomous vehicles, drone control and/or localization, emergency services, etc.

In some examples, location related services are based on radio frequency (RF) signals that are transmitted and received between two or more nodes. For example, and as described further herein, a base station can transmit a positioning reference signal (PRS) to one or more wireless devices. A wireless device can measure different parameters associated with the PRS and report the measurements to a location server. Based on the measurements, the location server can determine the location of the wireless device. In some examples, a wireless device can measure different parameters associated with the PRS and use the measurements to determine a position or location of the wireless device.

Systems, apparatuses, processes (also referred to as methods), and computer-readable media (collectively referred to as "systems and techniques") are described herein for secure position-based signaling (e.g., in an NTN or other network). For instance, the systems and techniques can provide signaling for positioning purposes, without indicating a location of a network device (e.g., a base station, a location server, a gateway, or a portion thereof such as in a distributed architecture). In some aspects, the systems and techniques can perform reference signal transmission timing compensation for wireless device positioning. In some cases, the systems and techniques can be used to perform reference signal (e.g., PRS) transmission timing pre-compensation for UE-based positioning. In one illustrative example, the systems and techniques described herein can perform reference signal (e.g., PRS) transmission timing pre-compensation for UE-based positioning without disclosing a location of a network device (e.g., base station such as a gNB, a location server such as a location management function (LMF), a gateway, etc., or a portion thereof) that transmits the reference signal.

In some aspects, a network device (e.g., base station, gateway, etc.) can perform a reference signal (e.g., PRS) transmission timing full pre-compensation to compensate a relative propagation time difference between two communication links used to transmit a first and second PRS, respectively. In some examples, one or more of the communication links can be feeder links of a non-terrestrial network (NTN). For example, as will be described in greater depth below with respect to FIG. 8, the network device (e.g., gateway) can fully compensate the relative propagation time difference between a first feeder link and a second feeder link such that a UE receives a PRS pair with an RTD equal to zero. In some cases, the UE can use the PRS pair with the fully compensated RTD of zero to perform UE-based positioning without being able to derive the location of the network device or gateway.

In one illustrative example, the network device can perform a reference signal (e.g., PRS) transmission timing partial pre-compensation. As will be described in greater depth below with respect to FIGS. 9A and 9B, the network device (e.g., gateway) can partially compensate the relative propagation time difference between a first feeder link and a second feeder link such that a UE receives a PRS pair with a random target RTD. In some cases, the UE can use the PRS pair with the partially compensated random target RTD to perform UE-based positioning without being able to derive the location of the network device or gateway.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated with a component of the core network, or alternatively may be external to the core network. In some examples, the location server 230 can be operated by a carrier or provider of the 5GC 210, a third party, an original equipment manufacturer (OEM), or other party. In some cases, multiple location servers can be provided, such as a location server for the carrier, a location server for an OEM of a particular device, and/or other location servers. In such cases, location assistance data can be received from the location server of the carrier and other assistance data can be received from the location server of the OEM.

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The network nodes or network entities (e.g., base stations) of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and/or security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

In some aspects, location and positioning functions can be aided by a Location Management Function (LMF) 270 that is configured for communication with the 5GC 260, e.g., to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated with a network node or entity (e.g., base station), such as the gNB 222 and/or the ng-eNB 224. When integrated with the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a network node or entity (e.g., base station).

As discussed herein, NR supports a number of cellular network-based positioning technologies, including downlink-based, uplink-based, and downlink-and-uplink-based positioning methods. For example, the LMF 270 can enable positioning based on location measurements computed for various positioning signal (PRS or SRS) resources. As used herein, "PRS resource set" is a set of PRS resources used for the transmission of PRS signals, where each PRS resource has a PRS resource identifier (ID). In addition, the PRS resources in a PRS resource set are associated with the same TRP. A PRS resource set is identified by a PRS resource set ID and is associated with a particular TRP (e.g., identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu} \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

In some cases, a PRS resource ID in a PRS resource set is associated with a single beam (and/or beam ID) transmitted from a single TRP (where a TRP may transmit one or more beams). For example, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer" or "layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb size. The Point A parameter takes the value of the parameter ARFCN-ValueNR (where "ARFCN" stands for "absolute radio-frequency channel number") and is an identifier and/or code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one network node or entity (e.g., a base station, or a macro cell base station and a small cell base station) to transmit data channels, while frequency layers are used by several (usually three or more) network nodes or entities (e.g., base stations) to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Downlink-based location measurements can include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of network nodes or entities (e.g., base stations), referred to as reference signal time difference (RSTD) or time difference of arrival (TDOA) measurements, and reports them to a positioning entity. More specifically, the UE receives the identifiers of a reference network node or entity (e.g., a serving base station) and multiple non-reference network nodes or entities (e.g., base stations) in assistance data. The UE then measures the RSTD between the reference network node or entity (e.g., reference base station) and each of the non-reference network nodes or entities (e.g., non-reference base stations). Based on the known locations of the involved network nodes/entities (e.g., base stations) and the RSTD measurements, the positioning entity (e.g., LMF 270) can estimate the UE's location. For DL-AoD positioning, a network node or entity (e.g., a base station such as gNB 222) measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a network node or entity (e.g., a base station) measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT or multi RTT"). In an RTT procedure, an initiator (a network node or entity, such as a base station, or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple network nodes or entities (e.g., base stations) to enable its location to be determined (e.g., using multilateration) based on the known locations of the network nodes (e.g., base stations). RTT and multi-RTT methods can be combined with other positioning techniques, such as UL-AoA and DL-AoD, to improve location accuracy.

To assist positioning operations, a location server (e.g., location server 230, LMF 270, or other location server) may provide assistance data to the UE. For example, the assistance data may include identifiers of the network nodes or entities (e.g., base stations or the cells and/or TRPs of the base stations) from which to measure reference signals, the reference signal configuration parameters (e.g., the number of consecutive positioning subframes, periodicity of positioning subframes, muting sequence, frequency hopping sequence, reference signal ID, reference signal bandwidth, etc.), and/or other parameters applicable to the particular positioning method. Alternatively, the assistance data may originate directly from the network nodes or entities (e.g., base stations) themselves, such as in periodically broadcasted overhead messages, etc. In some cases, the UE may be able to detect neighbor network nodes itself without the use of assistance data.

For DL-AoD, the UE 204 can provide DL-PRS beam RSRP measurements to the LMF 270, whereas the gNB 222 can provide the beam azimuth and elevation angle information. When using an UL-AoA positioning method, the position of UE 204 is estimated based on UL SRS AoA measurements taken at different TRPs (not illustrated). For example, TRPs can report AoA measurements directly to LMF 270. Using angle information (e.g., AoD or AoA) together TRP co-coordinate information and beam configuration details, the LMF 270 can estimate a location of UE 204.

For multi-RTT location measurements, the LMF 270 can initiate a procedure whereby multiple TRPs (not illustrated) and a UE perform the gNB Rx-Tx and UE Rx-Tx measurements, respectively. For example, the gNB 222 and UE 204 can transmit a downlink positioning reference signal (DL-PRS) and uplink sounding reference signal (UL-SRS), respectively, whereby the gNB 222 configures UL-SRS to the UE 204 e.g., using the RRC protocol. In turn, the LMF 270 can provide the DL-PRS configuration to the UE 204. Resulting location measurements are reported to the LMF 270 by the UE 204 and/or gNB 222 to perform location estimation for the UE 204.

To improve the accuracy of UE location estimates, NR can support the combination of multiple different location measurement types. As illustrated in FIG. 6, a UE device 602 can determine its capability to process a PRS resource (e.g., to measure location or position data) in a PRS system 600. The UE device 602 can then provide its capabilities to a base station 604 (shown as a gNB) or location server (e.g., LMF, not illustrated) in a capability update that can be used to determine which PRS resources are to be utilized for performing location or position measurements (e.g., to determine a location of the UE device 602). Thereafter, the UE device 602 can receive assistance data (AD) from the base station 604 or location server and perform PRS measurements based on the assistance data. However, in some cases the amount of assistance data (e.g., the number of PRS resources indicated by the assistance data) can be significantly greater than the capabilities of the UE device 602.

For example, the UE device 602 may only be capable of processing 5 PRS resources, yet the PRS assistance data may provide 20 PRS resources to the UE device 602. In this example, the UE device 602 may select a subset of PRS resources, such as 5 PRS resources, out of the 20 PRS resources with which to perform location or position measurements. In some cases, the UE may select the PRS resources based on a default order corresponding with the manner in which the resources are provided by the assistance data. For example, the UE can operate in a manner that assumes that the PRS resources are provided (e.g., in the AD) in a decreasing order of measurement priority. By way of example, within a positioning frequency layer, the DL PRS resources can be sorted in the AD in a decreasing priority order of measurement to be performed by the UE device 602, with a reference indicated by nr-DL-PRS-ReferenceInfo being the highest priority for measurement. Priorities can include up to 64 dl-PRS-IDs of the positioning frequency layer being sorted according to priority, or up to 2 DL PRS resource sets per dl-PRS-ID of the positioning frequency layer being sorted according to priority. In such cases, when the initially selected PRS resource cannot be utilized for PRS measurement purposes, the UE device 602 proceeds to the next PRS resource in an order of decreasing measurement priority. However, in some cases, the 5 selected PRS resources may not be optimal for performing PRS measurements.

In some aspects, additional PRS resource measurements may be requested, for example, by a location server (LMF). In such instances, the UE 602 may select adjacent/neighboring beams with which to perform the additionally requested PRS measurements. By way of example, UE 602 may use information regarding an optimal/primary first beam (e.g., PRS Beam 4 $606_4$) to identify one or more adjacent beams, such as PRS Beam 6 $606_3$ and/or PRS Beam 5 $606_5$. Additionally, in some implementations, quasi-collocation information may not be available to the UE. For example, SSB measurement information may be out of date, or absent from the received signaling information (e.g., AD).

FIG. 3 illustrates an example of a computing system 370 of a user equipment (UE) 307. In some examples, the UE 307 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 370 includes software and hardware components that can be electrically coupled via a bus 389 (or may otherwise be in communication, as appropriate). For example, the computing system 370 includes one or more processors 384. The one or more processors 384 can include one or more CPUs, ASICs, FPGAs, APs, GPUs, VPUs, NSPs, microcontrollers, dedicated hardware, any combination thereof, and/or other processing device or system. The bus 389 can be used by the one or more processors 384 to communicate between cores and/or with the one or more memory devices 386.

The computing system 370 may also include one or more memory devices 386, one or more digital signal processors (DSPs) 382, one or more subscriber identity modules (SIMs) 374, one or more modems 376, one or more wireless transceivers 378, an antenna 387, one or more input devices 372 (e.g., a camera, a mouse, a keyboard, a touch sensitive screen, a touch pad, a keypad, a microphone, and/or the like), and one or more output devices 380 (e.g., a display, a speaker, a printer, and/or the like).

The one or more wireless transceivers 378 can transmit and receive wireless signals (e.g., signal 388) via antenna 387 to and from one or more other devices, such as one or more other UEs, network devices (e.g., base stations such as eNBs and/or gNBs, WiFi routers, etc.), cloud networks, and/or the like. As described herein, the one or more wireless transceivers 378 can include a combined transmitter/receiver, discrete transmitters, discrete receivers, or any combination thereof. In some examples, the computing system 370 can include multiple antennae. The wireless signal 388 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 378 may include a radio frequency (RF) front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 388 into a baseband or intermediate frequency and can convert the RF signals to the digital domain.

In some cases, the computing system 370 can include a coding-decoding device (or CODEC) configured to encode and/or decode data transmitted and/or received using the one or more wireless transceivers 378. In some cases, the computing system 370 can include an encryption-decryption device or component configured to encrypt and/or decrypt data (e.g., according to the AES and/or DES standard) transmitted and/or received by the one or more wireless transceivers 378.

The one or more SIMs 374 can each securely store an International Mobile Subscriber Identity (IMSI) number and a related key assigned to the user of the UE 307. The IMSI and the key can be used to identify and authenticate the subscriber when accessing a network provided by a network service provider or operator associated with the one or more SIMs 374. The one or more modems 376 can modulate one or more signals to encode information for transmission using the one or more wireless transceivers 378. The one or more modems 376 can also demodulate signals received by the one or more wireless transceivers 378 in order to decode the transmitted information. In some examples, the one or more modems 376 can include a 4G (or LTE) modem, a 5G (or NR) modem, a Bluetooth™ modem, a modem configured for vehicle-to-everything (V2X) communications, and/or other types of modems. In some examples, the one or more modems 376 and the one or more wireless transceivers 378 can be used for communicating data for the one or more SIMs 374.

The computing system 370 can also include (and/or be in communication with) one or more non-transitory machine-readable storage media or storage devices (e.g., one or more memory devices 386), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 386 and executed by the one or more processor(s) 384 and/or the one or more DSPs 382. The computing system 370 can also include software elements (e.g., located within the one or more memory devices 386), including, for example, an operating system, device drivers, executable libraries, and/or other code, such as one or more application programs, which may comprise computer programs implementing the functions provided by various aspects, and/or may be designed to implement methods and/or configure systems, as described herein.

In some examples, UE 307 can implement carrier aggregation whereby UE 307 can receive and/or transmit on multiple carrier frequencies at the same time, thereby increasing downlink and uplink data rates. Thus, UE 307 may simultaneously utilize a first radio to tune to one carrier frequency (e.g., the anchor carrier) and second radio to tune to a different carrier frequency (e.g., a secondary carrier). In addition, each radio (e.g., each of the first and second radios) may be tunable to a plurality of different frequencies, one at a time.

FIG. 4 illustrates an example resource structure 400 that includes various groups of 5G/New Radio (NR) resources. For example, resource structure 400 can include a subframe 402 which can have a duration of 1 millisecond (ms) and can correspond to one of ten subframes included in a frame (not illustrated). In some examples, subframe 402 can include one or more slots such as slot 404 and slot 406. Although resource structure 400 is illustrated as having two slots per subframe, a different number of slots can be included in a subframe (e.g., 4 slots, 8 slots, 16 slots, 32 slots, or any other number of slots).

In some examples, each of slot 404 and slot 406 can include one or more orthogonal frequency-division multiplexing (OFDM) symbols such as symbol 408. As illustrated, slot 404 and slot 406 each include 14 symbols (e.g., symbol 408). In some cases, a slot may have a different number of symbols. In some aspects, each symbol can be transmitted using one or more frequency subcarriers. A symbol (e.g., symbol 408) that is transmitted on a single subcarrier can be referred to as a resource element (RE), such as RE 410. In some cases, a resource element (e.g., RE 410) can correspond to the smallest resource unit in a 5G/NR network, corresponding to one subcarrier in one OFDM symbol. In some examples, RE 410 can be identified according to its position using coordinates (k, l), in which 'k' corresponds to the index in the frequency domain (e.g., identifies the RE sub-carrier) and 'l' corresponds to the symbol position in the time domain relative to a reference point.

In some aspects, a group of 12 $RE_S$ can be referred to as a resource block (RB) such as resource block 412. In some aspects, a resource grid 414 can be used to represent downlink resources. As illustrated, resource grid 414 can correspond to a slot (e.g., slot 404) having 12 subcarriers and 14 resource elements. In some aspects, some REs can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. Resource grid 414 illustrates exemplary locations of $RE_S$ used to transmit DL-RS (labeled "R").

In some examples, a collection of resource elements ($RE_S$) that are used for transmission of PRS can be referred to as a "PRS resource." The collection of resource elements can span multiple subcarriers in the frequency domain and 'N' (e.g., 1 or more) consecutive symbol(s) within a slot in the time domain.

In some aspects, the transmission of a PRS resource can have a particular comb size (also referred to as the "comb density"). A comb size 'N' represents the subcarrier spacing (or frequency/tone spacing) within each symbol of a PRS resource configuration. For example, a comb size 'N' can cause a PRS to be transmitted in every Nth subcarrier of a symbol of a PRB. For example, for comb-4, for each of the fourth symbols of the PRS resource configuration, $RE_S$ corresponding to every fourth subcarrier (e.g., subcarriers 0, 4, 8) are used to transmit PRS of the PRS resource. In some examples, comb sizes of comb-2, comb-4, comb-6, and comb-12 can be used for DL-PRS. FIG. 4 illustrates an exemplary PRS resource configuration for comb-6 (which spans six symbols in the time domain and has 6 subcarriers of spacing).

Figures 5A, 5B, 5C, 5D, 5E, 5F, 5G, 5H:
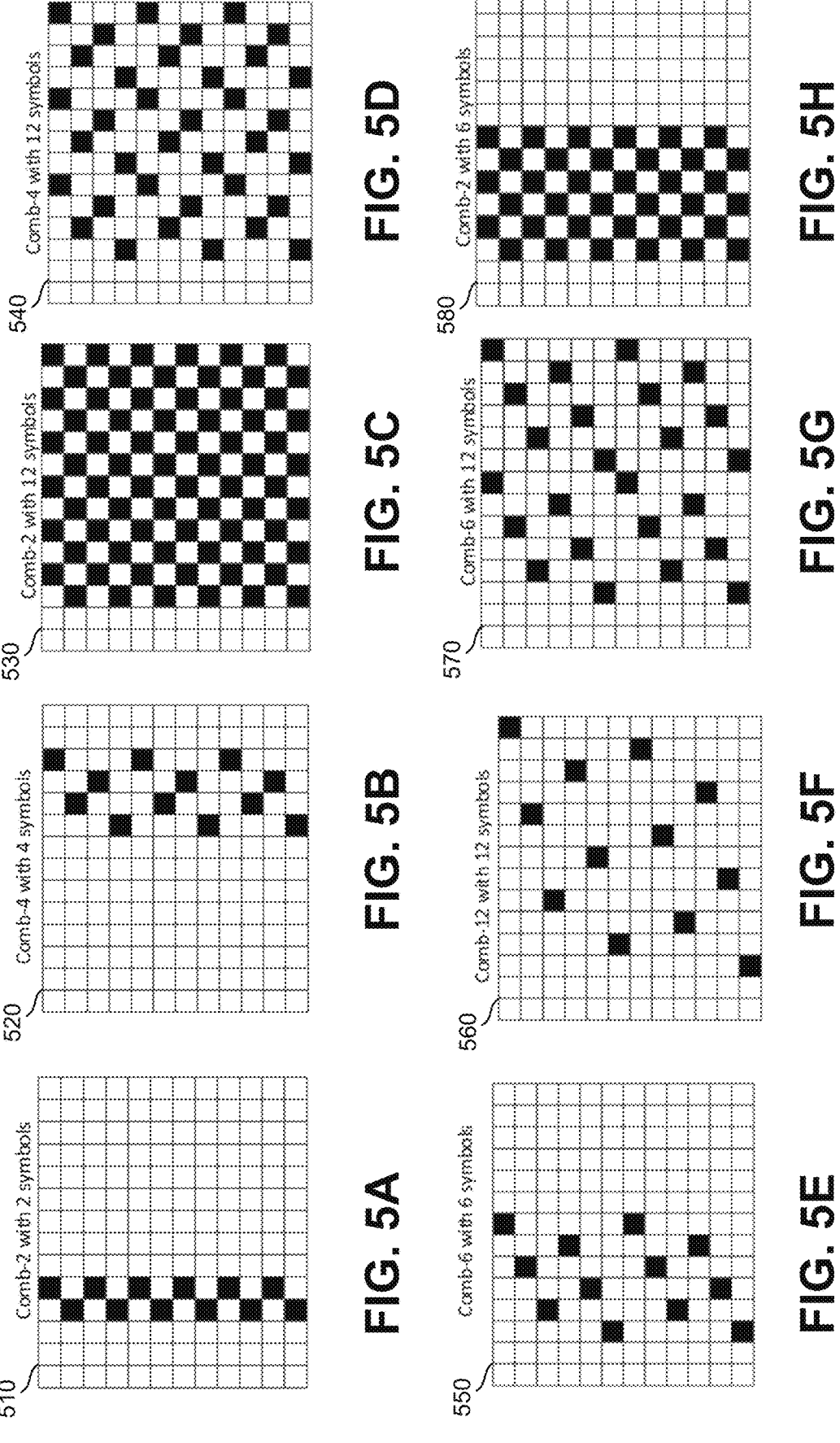

FIGS. 5A-5H illustrate further examples of PRS resource configurations using different comb sizes. For example, FIG. 5A includes chart 510 which illustrates a configuration of comb-2 with 2 symbols. FIG. 5B includes chart 520 which illustrates a configuration of comb-4 with 4 symbols. FIG. 5C includes chart 530 which illustrates a configuration of comb-2 with 12 symbols. FIG. 5D includes chart 540 which illustrates a configuration of comb-4 with 12 symbols. FIG. 5E includes chart 550 which illustrates a configuration of comb-6 with 6 symbols. FIG. 5F includes chart 560 which illustrates a configuration of comb-12 with 12 symbols. FIG. 5G includes chart 570 which illustrates a configuration of comb-6 with 12 symbols. FIG. 5H includes chart 580 which illustrates a configuration of comb-2 with 6 symbols.

In some examples, configuration of the PRS resource can correspond to a pseudo-random Quadrature Phase Shift Keying (QPSK) sequence that can change periodically (e.g., per OFDM symbol, per slot, etc.). In one illustrative example, the pseudo-random sequence generator can be initialized using the relationship of equation (1) below, in which $$n_{s,f}^{\mu}$$

is the slot number, the downlink PRS sequence ID $$n_{ID,seq}^{PRS}$$

$\in \{0, 1, \ldots 4095\}$ is obtained based on a higher level parameter (e.g., dl-PRS-SequenceID-r16), and 1 is the OFDM symbol within the slot to which the sequence is mapped. The relationship of equation (1) is provided as follows:

$$c_{init} = \left(2^{22}\left\lfloor\frac{n_{ID,seq}^{PRS}}{1024}\right\rfloor + 2^{10}\left(N_{symb}^{slot}n_{s,f}^{\mu} + l + 1\right)\left(2\left(n_{ID,seq}^{PRS} \bmod 1024\right) + 1\right) + \left(n_{ID,seq}^{PRS} \bmod 1204\right)\right) \bmod 2^{31} \quad (1)$$

In some examples, a "PRS resource set" can correspond to a set of PRS resources used for the transmission of PRS signals, where each PRS resource has a PRS resource identifier (ID). In some cases, the PRS resources in a PRS resource set can be associated with the same Transmission-Reception Point (TRP). In some aspects, a PRS resource set can be identified by a PRS resource set ID and can be associated with a specific TRP (identified by a TRP ID). In addition, the PRS resources in a PRS resource set can have the same periodicity, a common muting pattern configuration, and the same repetition factor (e.g., PRS-ResourceRepetitionFactor) across slots. In some aspects, the periodicity is the time from the first repetition of the first PRS resource of a first PRS instance to the same first repetition of the same first PRS resource of the next PRS instance. The periodicity may have a length selected from $2^{\mu}\cdot\{4, 5, 8, 10, 16, 20, 32, 40, 64, 80, 160, 320, 640, 1280, 2560, 5120, 10240\}$ slots, with $\mu=0, 1, 2, 3$. In some examples, the repetition factor may have a length selected from $\{1, 2, 4, 6, 8, 16, 32\}$ slots.

In some aspects, a PRS resource ID in a PRS resource set can be associated with a single beam (and/or beam ID) transmitted from a single TRP (where a TRP may transmit one or more beams). For instance, each PRS resource of a PRS resource set may be transmitted on a different beam, and as such, a "PRS resource," or simply "resource," can also be referred to as a "beam."

In some examples, a "PRS instance" or "PRS occasion" can correspond to one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," a "positioning repetition," or simply an "occasion," an "instance," or a "repetition."

In some aspects, a "positioning frequency layer" (also referred to simply as a "frequency layer" or "layer") can be a collection of one or more PRS resource sets across one or more TRPs that have the same values for certain parameters. For example, the collection of PRS resource sets can have the same subcarrier spacing (SCS) and cyclic prefix (CP) type, the same reference point for resource grids in frequency domain (e.g., point A), the same value of the downlink PRS bandwidth, the same start PRB (and center frequency), and the same comb size.

FIG. 7 illustrates an example of a wireless communications network 700, in accordance with some aspects of the present disclosure. In some examples, wireless communication network 700 can include a network entity 720 that uses one or more intermediate nodes (e.g., such as satellites 732 and 734) to communicate with one or more UEs (e.g., such as UE 710). In one illustrative example, wireless communication network 700 can be a non-terrestrial network (NTN), as will be explained in greater depth below.

The network entity 720 can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In one illustrative example, the network entity 720 can be a wireless gateway and/or a gNB. In some examples, network entity 720 can be an NTN gateway included in an NTN network.

An NTN can be provided as an NG-RAN including multiple gNBs. The gNBs can provide non-terrestrial NR access to UEs (e.g., UE 710), for example using an NTN gateway (e.g., network entity 720) and an NTN payload embarked on an airborne and/or space-borne NTN vehicle (e.g., one or more of satellites 732 and 734). In some cases, the NTN gateway 720 can be an earth station located at the surface of the earth, providing connectivity to the NTN payload using a feeder link. In some cases, the NTN gateway 720 can be a base station that includes or is communicatively coupled to one or more gNBs. In some examples, the NTN gateway 720 can be provided by one or more gNBs. The NTN gateway 720 can be a transport network layer (TNL) node. An NTN payload can be a network node, embarked onboard a satellite and/or other high-altitude platform station, providing connectivity functions using feeder links (e.g., from the NTN gateway 720 to the satellites 732 and 734) and service links (e.g., from the satellites 732 and 734 to the UE 710). The NTN payload can be a transport network layer (TNL) node.

As illustrated in FIG. 7, non-terrestrial network (e.g., NR) access can be provided between UE 710 and gateway 720 using at least a first satellite 732 and a second satellite 734. For example, gateway 720 can communicate with UE 710 (and vice versa) using first satellite 732. In this example, gateway 720 can transmit one or more communications or signals to the first satellite 732 using a communication link 742 (also referred to as a "feeder link"). First satellite 732 can re-transmit or relay the communications or signals received from gateway 720 to the UE 710 using a communication link 752 (also referred to as a "service link").

Additionally, or alternatively, gateway 720 can communicate with UE 710 (and vice versa) using second satellite 734. In this example, gateway 720 can transmit one or more communications or signals to the second satellite 734 using a communication link 744 (also referred to as a "feeder link"). Second satellite 734 can re-transmit or relay the communications or signals received from gateway 720 to UE 710 using a communication link 754 (also referred to as a "service link").

In one illustrative example, gateway 720 can transmit a first reference signal using the first feeder link 742 and can transmit a second reference signal using the second feeder link 744. In some cases, one or more (or both) of the first reference signal and the second reference signal can be a positioning reference signal (PRS), as has been described previously. For example, gateway 720 can use the first feeder link 742 to transmit a first PRS and can use the second feeder link 744 to transmit a second PRS. In some cases, the first and second PRS can be a PRS pair generated by gateway 720 and/or by a location server (e.g., LMF) in communication with gateway 720.

First satellite 732 can subsequently retransmit the first PRS to UE 710 using the first service link 752 and second satellite 734 can subsequently retransmit the second PRS to UE 710 using the second service link 754. In some cases, UE 710 can use the first PRS and the second PRS to perform UE-based positioning (e.g., UE 710 can use the received PRS pair to determine its own location). For example, UE 710 can measure the time of arrival for the first PRS and the time of arrival for the second PRS. Using the two measured times of arrival, UE 710 can determine a downlink time difference of arrival (DL-TDOA, also referred to as "TDOA") between the PRS pair. UE 710 can then perform UE-based positioning based at least in part on the determined TDOA for the PRS pair and the known location from which each PRS was transmitted.

In some cases, UE 710 can determine the TDOA for the first and second PRS by using its internal time base to determine the time of arrival for the first PRS and the time of arrival for the second PRS. For example, UE 710 can determine that it received the first PRS (e.g., retransmitted by first satellite 732 over first service link 752) at a time $t_1$ and that it received the second PRS (e.g., retransmitted by second satellite 734 over second service link 754) at a time $t_2$. The DL-TDOA can then be calculated as $t_2-t_1$ if the first PRS and the second PRS were transmitted synchronously (e.g., if first satellite 732 transmitted the first PRS at the same time as second satellite 734 transmitted the second PRS).

If the first PRS and the second PRS were not transmitted synchronously (e.g., first satellite 732 transmitted the first PRS at a different time than second satellite 734 transmitted the second PRS), then the DL-TDOA can be calculated as $t_2-t_1$ plus a relative time difference (RTD) term:

$$\text{DL-TDOA}=(t_2-t_1)+\text{RTD}$$

The relative time difference or RTD between first satellite 732 and second satellite 734 can be the relative synchronization difference between the two satellites. For example, if first satellite 732 began transmitting the first PRS at a time $t_{1,i}$ and second satellite 734 began transmitting the second PRS at a time $t_{2,i}$ then the RTD can be given as $t_{1,i}-t_{2,i}$. It is noted that if first satellite 732 and second satellite 734 begin transmitting at the same time, then RTD=0 (e.g., and the DL-TDOA can be calculated as $t_2-t_1$, as in the earlier example of synchronous transmission by the two satellites). In some cases, the RTD between two or more reference signals (e.g., a PRS) can be referred to as a reference signal time difference (RSTD).

In some examples, the RTD between first satellite 732 and second satellite 734 can be signaled or transmitted to UE 710 as assistance data. For example, UE 710 may itself be unable to measure or determine the RTD between first satellite 732 and second satellite 734. In one illustrative example, UE 710 can receive assistance data including RTD information for performing the UE-based positioning described above. For example, the RTD between first satellite 732 and second satellite 734 can be signaled or transmitted to UE 710 as NR-RTD-Info assistance data. The NR-RTD-Info assistance data can correspond to the NR-RTD-Info field defined in 3GPP Technical Specification (TS) 37.355. In some cases, the NR-RTD-Info assistance data can be transmitted to UE 710 by the gateway 720 and/or a gNB associated with gateway 720. In some cases, the NR-RTD-Info assistance data can be transmitted to UE 710 by a location server or LMF (not shown). The location server or LMF can be in communication with gateway 720 and/or one or more portions of the wireless communication network 700.

In some cases, the assistance data can include location information of the transmission-reception points (e.g., first satellite 732 and second satellite 734) from which the UE 710 received the first and second PRS. For example, as mentioned above, the UE 710 can perform UE-based positioning based on a combination of the TDOA determined for the PRS pair (e.g., the first PRS and the second PRS) and location information of the satellites from which UE 710 received the PRS pair (e.g., first satellite 732 and second satellite 734). In some examples, the location information (e.g., included in the assistance data) for one or more of first satellite 732 and second satellite 734 can be determined from ephemeris information and/or orbital models of the satellite(s).

As described above, UE 710 can perform UE-based positioning using location information of the first and second satellites 732, 734 (e.g., included in assistance data received by UE 710) and the determined TDOA between the first and second PRS (e.g., determined based on the measured time of arrival of each PRS and the RTD information for the first and second satellites 732, 734). However, in some cases, in addition to deriving its own position, UE 710 may also use the location information of the first and second satellites 732, 734 and the determined TDOA between the PRS pair to derive the location of the network entity (e.g., gateway 720 or a gNB).

For example, if the first satellite 732 and the second satellite 734 are transparent satellites, the UE 710 may be able to derive the location of gateway 710. This can be undesirable for various reasons. In some cases, network operators and/or gateway owners may want to keep the location of network entities such as gateway 720 hidden, for example, due to security or privacy concerns and/or regulatory requirements.

Transparent satellites forward received communication signals without implementing timing control or delay mechanisms (e.g., a transparent satellite may retransmit or relay received communication signals immediately). For example, if the first and second satellites 732, 734 are transparent satellites, then the time at which first satellite 732 receives a communication over feeder link 742 (e.g., from gateway 720) can be approximately the same as the time at which first satellite 732 retransmits the received communication over service link 752 (e.g., to UE 710). Similarly, the time at which second satellite 734 receives a communication over feeder link 744 can be approximately the same as the time at which second satellite 734 retransmits the received communication over service link 754.

When first and second satellites 732, 734 are transparent satellites, UE 710 can use the RTD between the two satellites to derive the RTD of the feeder links 742, 744. The RTD of the feeder links 742, 744 can then be used to derive the location of the gateway 720. For example, the RTD between the two satellites can indicate the difference between the time first satellite 732 began transmitting the first PRS and the time second satellite 734 began transmitting the second PRS. When first and second satellites 732, 734 are transparent satellites, the time first satellite 732 began transmitting the first PRS (e.g., to UE 710) is approximately equal to the time first satellite 732 received the first PRS from gateway 720 (e.g., via feeder link 742). Similarly, the time second satellite 734 began transmitting the second PRS (e.g., to UE 710) is approximately equal to the time second satellite 734 received the second PRS from gateway 720 (e.g., via feeder link 744).

Therefore, if gateway 720 transmits the first PRS and the second PRS at the same time, the RTD between the first and second service links 752, 754 (e.g., included in the assistance data provided to UE 710) can be the same as the RTD between the first and second feeder links 742, 744.

In some cases, UE 710 can combine the derived RTD between the first and second feeder links 742, 744 with the known locations of first satellite 732 and second satellite 734 (e.g., which can be included in the assistance data provided to UE 710) to thereby obtain or derive the location of gateway 720. For example, UE 710 can derive the location of gateway 720 using a same or similar TDOA calculation as was described above with respect to UE 710 determining its own location using the RTD between first and second service links 752, 754 and the two satellite locations.

As mentioned above, it can be undesirable for UEs (e.g., UE 710) to be able to derive the location of gateway 720 and/or other network devices that transmit PRS pairs to transparent satellites or other NTN nodes. In some approaches, RTD information for service links (e.g., service links 752, 754) and/or transparent satellites (e.g., satellites 732, 734) is omitted from the assistance data provided to UE 710. For example, the assistance data NR-RTD-Info may not be signaled to UE 710 due to concerns that UE 710 could use the NR-RTD-Info assistance data to derive the location of gateway 720.

Without the RTD information for the service links/satellites, UE 710 can be prevented from deriving the location of gateway 720. However, without the RTD information for the service links/satellites, UE 710 is also unable to determine its own location (e.g., is unable to perform UE-based positioning). Systems and techniques are needed for UEs (e.g., UE 710) to perform UE-based positioning without exposing the location of the gateway (e.g., 720).

Systems, apparatuses, processes (also referred to as methods), and computer readable media (collectively referred to as "systems and techniques") are described herein for reference signal transmission timing pre-compensation for UE-based positioning. In some aspects, the systems and techniques can be used to perform PRS transmission timing pre-compensation for UE-based positioning. In one illustrative example, the systems and techniques described herein can perform reference signal (e.g., PRS) transmission timing pre-compensation for UE-based positioning without disclosing a network device or gateway location. In some aspects, the network device or gateway can be an NTN gateway and/or gNB.

In one illustrative example, the network device or gateway can perform a PRS transmission timing full pre-compensation that compensates the relative propagation time difference between two feeder links used to transmit a first and second PRS, respectively. For example, as will be described in greater depth below with respect to FIG. 8, the network device (e.g., gateway) can fully compensate the relative propagation time difference between a first feeder link and a second feeder link such that a UE receives a PRS pair with an RTD equal to zero. In some cases, the UE can use the PRS pair with the fully compensated RTD of zero to perform UE-based positioning without being able to derive the location of the network device or gateway.

In one illustrative example, the network device or gateway can perform a PRS transmission timing partial pre-compensation. As will be described in greater depth below with respect to FIGS. 9A and 9B, the network device (e.g., gateway) can partially compensate the relative propagation time difference between a first feeder link and a second feeder link such that a UE receives a PRS pair with a random target RTD. In some cases, the UE can use the PRS pair with the partially compensated random target RTD to perform UE-based positioning without being able to derive the location of the network device or gateway.

FIG. 8 illustrates an example of a wireless communications network 800 with reference signal transmission timing full pre-compensation, in accordance with some aspects of the present disclosure. In some examples, the wireless communications network 800 can be an NTN network with PRS transmission timing full pre-compensation. In some cases, the wireless communication network 800 can be the same as or similar to the wireless communication network 700 of FIG. 7. As illustrated, the wireless communication network 800 can include a network entity 820, a first network node 832 and a second network node 834, and a UE 810. In some examples, network entity 820 can be the same as or similar to the network entity 720 of FIG. 7. For example, network entity 820 can be a gateway, gNB, base station, etc.

One or more of first network node 832 and second network node 834 can be a communications satellite or other airborne network node. For example, first network node 832 can be a first satellite 832 and second network node 834 can be a second satellite 834. In some examples, first satellite 832 can be the same as or similar to the first satellite 732 of FIG. 7 and/or the second satellite 834 can be the same as or similar to the second satellite 734 of FIG. 7. In some cases, one or more of first satellite 832 and second satellite 834 can be a transparent satellite, as described above. Gateway 820 can transmit a first reference signal to first satellite 832 using a first communication link 842. In some examples, the first communication link 842 can be a first feeder link (e.g., can be the same as or similar to the first feeder link 742 of FIG. 7). Gateway 820 can transmit a second reference signal to second satellite 834 using a second communication link 844. In some examples, the second communication link 844 can be a second feeder link (e.g., can be the same as or similar to the second feeder link 744 of FIG. 7). In one illustrative example, the first reference signal can be a first PRS and the second reference signal can be a second PRS (e.g., collectively referred to as a "PRS pair"). First satellite 832 can transmit the first PRS (e.g., received from gateway 820) to UE 810 using a communication link 852. In some examples, the communication link 852 can be a first service link (e.g., can be the same as or similar to the first service link 752 of FIG. 7). Second satellite 834 can transmit the second PRS (e.g., received from gateway 820) to UE 810 using a communication link 854. In some examples, the communication link 854 can be a second service link (e.g., can be the same as or similar to the second service link 754 of FIG. 7).

In one illustrative example, the gateway 820 can implement a PRS transmission timing full pre-compensation by fully compensating the relative propagation time difference between the first feeder link 842 and the second feeder link 844. As illustrated, first feeder link 842 can have a first propagation time T(G,1), which can represent the elapsed time for a signal (e.g., the first PRS) to travel from gateway 820 to the first satellite 832. Second feeder link 844 can have a second propagation time T(G,2), which can represent the elapsed time for a signal (e.g., the second PRS) to travel from gateway 820 to the second satellite 834. The relative propagation time difference between the first feeder link 842 and the second feeder link 844 can be determined as T(G,1)–T(G,2).

One or more of the first propagation time T(G,1) and the second propagation time T(G,2) can be determined based on the known location of gateway 820 and the known location (s) of first satellite 832 and second satellite 834, respectively. For example, gateway 820 can determine the length of first feeder link 842 (e.g., the distance between gateway 820 and first satellite 832) based on the known locations of gateway 820 and first satellite 832. The first propagation time T(G,1) can then be determined by dividing the length of first feeder link 842 by a known propagation speed c. Gateway 820 can use a same or similar approach to determine the length of second feeder link 844, and therefore the second propagation time T(G,2).

In some examples, the location of one or more of first satellite 832 and second satellite 834 can be determined for a given time t using satellite ephemeris data and/or trajectory model(s). In some cases, gateway 820 can obtain the satellite ephemeris data and/or trajectory models and determine the location of first satellite 832 and/or second satellite 834 locally. For example, gateway 820 can obtain the satellite ephemeris data and/or trajectory models from a location server (e.g., LMF) or other component of or within wireless communication network 800. In some cases, wireless communication network 800 can determine the location of first satellite 832 and/or second satellite 834 and provide the determined location(s) to gateway 820. For example, gateway 820 can transmit a request to wireless communications network 800 (or a component thereof), where the request includes an identifier of the satellite for which location information is being requested and a particular time t for which the location information should be calculated.

In one illustrative example, gateway 820 can use the relative propagation time difference between feeder links 842 and 844 (e.g., T(G,1)–T(G,2)) as a transmission timing compensation between the first PRS and the second PRS.

For example, the relative propagation time difference between first feeder link 842 and second feeder link 844 may be one second, because first satellite 832 is farther away from gateway 820 than second satellite 834 (e.g., it takes one second longer for the first PRS to propagate along first feeder link 842 than it takes for the second PRS to propagate along second feeder link 844). This relative propagation time difference can arise based on the different lengths of the feeder links, as described above.

In the example in which the relative propagation time difference between first feeder link 842 and second feeder link 844 (e.g., T(G,1)–T(G,2)) is one second, gateway 820 can perform PRS transmission timing full pre-compensation by transmitting the first PRS and the second PRS one second apart. In one illustrative example, gateway 820 can delay the transmission of the second PRS (e.g., over second feeder link 844) relative to the transmission of the first PRS (e.g., over first feeder link 842) by the determined transmission timing compensation value of one second.

By using the calculated relative propagation time difference between first feeder link 842 and second feeder link 844 as a PRS transmission timing compensation value, gateway 820 can transmit the PRS pair (e.g., first PRS and second PRS) such that the first PRS is received by first satellite 832 at the same time as the second PRS is received by second satellite 834. For example, as illustrated in FIG. 8, the propagation time of the first PRS along the first feeder link 842 (e.g., T(G,1)) is equal to the propagation time of the second PRS along the second feeder link 844 (e.g., T(G,2)) plus the determined transmission timing compensation.

When first satellite 832 receives the first PRS at the same time as second satellite 834 receives the second PRS, the first satellite 832 retransmits the first PRS to UE 810 at the same time as second satellite 834 retransmits the second PRS to UE 810 (e.g., because first and second satellites 832, 834 are transparent satellites). As was described previously, the RTD between first satellite 832 and second satellite 834 is therefore zero.

In one illustrative example, UE 810 can subsequently determine its own location using UE-based positioning while being unable to derive the location of gateway 820. For example, UE 810 can determine a TDOA between the first PRS (e.g., received from first satellite 832 over first service link 852) and the second PRS (e.g., received from second satellite 834 over second service link 854) and use the determined TDOA to perform UE-based positioning, as described above with respect to FIG. 7.

Because UE 810 receives the first PRS and the second PRS with an RTD of zero (e.g., based on the full PRS transmission timing pre-compensation performed by gateway 820), the UE can be prevented from deriving the location of gateway 820. For example, when UE 810 receives the PRS pair with an RTD of zero, UE 810 may determine that the first and second satellites 832, 834 also received the PRS pair from gateway 820 with an RTD of zero (e.g., because first and second satellites 832, 834 are transparent satellites that immediately retransmit the PRS upon receipt from gateway 820). If UE 810 attempts to derive the location of gateway 820 based on the fully compensated feeder link RTD of zero, UE 810 will derive an incorrect location for gateway 820 (e.g., because the fully compensated RTD of zero masks or hides the true underlying feeder link RTD of T(G,1)–T(G,2)).

In some examples, UE 810 can receive assistance data that includes an NR-RTD-Info (e.g., the RTD between first satellite 832 and second satellite 834) set equal to zero. For example, a location server (e.g., LMF) can communicate assistance data with NR-RTD-Info=0 to UE 810. In some cases, the location server or LMF can transmit a request to gateway 820 for PRS transmission timing full pre-compensation, and in response can also transmit the assistance data with NR-RTD-Info=0 to the UE 810. In some examples, the location server or LMF can omit the assistance data NR-RTD-Info (e.g., UE 810 receives no assistance data indicating an RTD between first satellite 832 and second satellite 834). The location server or LMF can omit the assistance data NR-RTD-Info in response to transmitting a request to gateway 820 for PRS transmission timing full pre-compensation. In some cases, UE 810 can assume or infer an RTD of zero between first satellite 832 and second satellite 834 based on receiving assistance data that does not include the NR-RTD-Info.

In the above example of FIG. 8, gateway 820 performed PRS transmission timing full pre-compensation such that the perceived RTD (e.g., by UE 810) between first satellite 832 and second satellite 834 was equal to zero. In some cases, gateway 820 can perform PRS transmission timing full pre-compensation by calculating the current location of first satellite 832 and second satellite 834, and then determining a transmission timing compensation value (e.g., for offsetting the transmission of the first PRS on first feeder link 842 and the transmission of the second PRS on second feeder link 844) based on the calculated satellite locations. In some examples, it may be computationally demanding to calculate the current location of each satellite before gateway 820 transmits one or more PRS pairs.

In one illustrative example, the systems and techniques described herein can be used to perform a PRS transmission timing partial pre-compensation without having to calculate current satellite locations. For example, as will be described in greater depth below with respect to FIGS. 9A and 9B, a network device (e.g., gateway) can partially compensate the relative propagation time difference between a first feeder link and a second feeder link such that a UE receives a PRS pair with a random target RTD. In some examples, the partially compensated random target RTD provided to the UE can mask or hide the true underlying feeder link RTD that the UE might otherwise use to derive a location of the network device (e.g., gateway). In some cases, the network device (e.g., gateway) can use the partially compensated random target RTD to mask or hide the true underlying feeder link RTD without calculating satellite locations.

FIG. 9A illustrates an example of a wireless communications network 900a with reference signal transmission timing partial pre-compensation, in accordance with some aspects of the present disclosure. The reference signal transmission timing partial pre-compensation can be a random partial pre-compensation. In some examples, the wireless communications network 900a can be an NTN network with PRS transmission timing partial pre-compensation. In some cases, the wireless communications networks 900a can be the same as or similar to one or more of the wireless communications network 700 of FIG. 7 and/or the wireless communications network 800 of FIG. 8. As illustrated, wireless communications network 900a can include a network entity 920, a first network node 932 and a second network node 934, and a UE 910. The wireless communications network 900a can additionally include a location server (e.g., LMF) 970 in communication with network entity 920. In some examples, network entity 920 can be the same as or similar to one or more of the network entity 720 of FIG. 7 and/or the network entity 820 of FIG. 8. For example, network entity 920 can be a gateway, gNB, base station, etc.

One or more of first network node 932 and second network node 934 can be a communications satellite or other airborne network node. For example, first network node 932 can be a first satellite 932 and second network node 934 can be a second satellite 934. In some examples, first satellite 932 can be the same as or similar to the first satellite 732 of FIG. 7 and/or the first satellite 832 of FIG. 8. The second satellite 934 can be the same as or similar to the second satellite 734 of FIG. 7 and/or the second satellite 834 of FIG. 8. In some cases, one or more of first satellite 932 and second satellite 934 can be a transparent satellite, as described above. Gateway 920 can transmit a first reference signal to first satellite 932 using a first communication link 942. In some examples, the first communication link 942 can be a first feeder link (e.g., can be the same as or similar to the first feeder link 742 of FIG. 7 and/or the first feeder link 842 of FIG. 8). Gateway 920 can transmit a second reference signal to second satellite 934 using a second communication link 944. In some examples, the second communication link 944 can be a second feeder link (e.g., can be the same as or similar to the second feeder link 744 of FIG. 7 and/or the second feeder link 844 of FIG. 8). In one illustrative example, the first reference signal can be a first PRS and the second reference signal can be a second PRS (e.g., collectively referred to as a "PRS pair"). First satellite 932 can transmit the first PRS (e.g., received from gateway 920) to UE 910 using a communication link 952. In some examples, the communication link 952 can be a first service link (e.g., can be the same as or similar to the first service link 752 of FIG. 7 and/or the first service link 852 of FIG. 8). Second satellite 934 can transmit the second PRS (e.g., received from gateway 920) to UE 910 using a communication link 954. In some examples, the communication link 954 can be a second service link (e.g., can be the same as or similar to the second service link 754 of FIG. 7 and/or the second service link 854 of FIG. 8).

In one illustrative example, the gateway 920 can implement a PRS transmission timing partial pre-compensation by partially compensating the relative propagation time difference between the first feeder link 942 and the second feeder link 944. The PRS transmission timing partial pre-compensation can be a random partial pre-compensation. For example, the gateway 920 can determine the random partial pre-compensation value based on a target random RTD between the first feeder link 942 and the second feeder link 944 (e.g., which, from the perspective of UE 910, can be the same as the RTD between first service link 952 and second service link 954).

For example, gateway 920 can receive a request to perform random partial pre-compensation transmission timing. In some cases, gateway 920 can receive a request to perform random partial pre-compensation transmission timing for at least a first PRS and a second RPS (e.g., a PRS pair). As illustrated, gateway 920 can receive the request to perform random partial pre-compensation transmission timing from a location server 970 (e.g., LMF). As will be described in greater depth below, the gateway 920 can determine a random timing compensation value based on the request. In one illustrative example, gateway 920 can use the determined random timing compensation value as an offset between the transmission of the first PRS (e.g., using the first feeder link 942) and the transmission of the second PRS (e.g., using the second feeder link 944).

In some examples, the gateway 920 can determine a target random RTD between first feeder link 942 and second feeder link 944 in response to receiving a request to perform random partial pre-compensation (e.g., from location server/

LMF 970, as illustrated). For example, gateway 920 can determine the target random RTD using a random number generator. In some cases, gateway 920 can determine the target random RTD using a random number generator constrained by an upper and/or lower limit. The upper and/or lower limit can be pre-determined. In some cases, one or more of the upper limit and the lower limit can be included in signaling (e.g., the random partial pre-compensation transmission timing request received by gateway 920 from location server/LMF 970).

Based on the determined target random RTD, gateway 920 can determine a random timing compensation value to use as an offset between the transmission of the first PRS (e.g., using first feeder link 942) and the transmission of the second PRS (e.g., using second feeder link 944). For example, gateway 920 can determine the random timing compensation value such that: $T(G,1)-[T(G,2)+$random timing compensation value$]$=target random RTD.

Based on gateway 920 transmitting the first PRS and the second PRS with an offset equal to the random timing compensation value, UE 910 can measure or perceive an RTD between the first satellite 932 and the second satellite 934 that is equal to the target random RTD previously determined by gateway 920 (e.g., again because gateway 920 determines the random timing compensation value such that the RTD between first satellite 932 and second satellite 934 is equal to the target random RTD).

In one illustrative example, UE 910 can subsequently determine its own location using UE-based positioning while being unable to derive the location of gateway 920. For example, UE 910 can determine a TDOA between the first PRS (e.g., received from first satellite 932 over first service link 952) and the second PRS (e.g., received from second satellite 934 over second service link 954) and use the determined TDOA to perform UE-based positioning, as described above with respect to FIGS. 7 and 8.

Because UE 910 receives the first PRS and the second PRS with an RTD equal to the target random RTD determined by gateway 920 (e.g., based on the partial PRS transmission timing pre-compensation performed by gateway 920), the UE 910 can be prevented from deriving the location of gateway 920. For example, if UE 910 attempts to derive the location of gateway 920 based on the random partially compensated RTD between service links 952 and 954, the UE 910 will derive an incorrect location for gateway 920 (e.g., because the random partially compensated RTD masks or hides the true underlying feeder link RTD of $T(G,1)-T(G,2)$).

In some examples, UE 910 can receive assistance data that includes an NR-RTD-Info (e.g., the RTD between first satellite 932 and second satellite 934) set equal to the target random RTD determined by gateway 920. UE 910 can use the NR-RTD-Info from the assistance data in combination with the measured time of arrival of the first PRS (e.g., from first satellite 932) and the second PRS (e.g., from second satellite 934) to determine a TDOA between the PRS pair. UE 910 can then use the determined TDOA between the PRS pair in combination with location information of first satellite 932 and second satellite 934 to perform UE-based positioning, without being able to derive a location of gateway 920.

In one illustrative example, gateway 920 can signal the target random RTD to the location server 970 (e.g., LMF). For example, gateway 920 can determine the target random RTD in response to receiving the random partial pre-compensation transmission timing request from location server 970, and signal the target random RTD to the location server

970 prior to or simultaneous with initiating the transmission of the PRS pair. In response to receiving the target random RTD from gateway 920, the location server 970 (e.g., LMF) can communicate assistance data with NR-RTD-Info=target random RTD (e.g., as determined by gateway 920) to UE 910.

In some aspects, gateway 920 can directly signal the target random RTD to the UE 910. For example, gateway 920 can determine the target random RTD in response to receiving the random partial pre-compensation transmission timing request from location server 970, and communicate assistance data with NR-RTD-Info=target random RTD to UE 910. In some examples, where location server 970 (e.g., LMF) transmits a random partial pre-compensation transmission timing request to gateway 920 but does not receive a signal or indication of the target random RTD determined by gateway 920, the location server 970 (e.g., LMF) can assume that the gateway 920 will include the target random RTD in the NR-RTD-Info assistance data.

In another illustrative example, the target random RTD can be determined by location server 970 (e.g., LMF) rather than by gateway 920 as described above with respect to FIG. 9A. FIG. 9B illustrates an example wireless communications network 900*b* in which location server 970 (e.g., LMF) determines a target random RTD and transmits the target random RTD to gateway 920. In some examples, one or more of wireless communications network 900*b* and the components thereof can be the same as those in wireless communications network 900*a* of FIG. 9A (e.g., as described above).

In some cases, location server 970 (e.g., LMF) can determine the target random RTD and include the target random RTD in the random partial pre-compensation transmission timing request transmitted to gateway 920. In response to receiving the request, gateway 920 can extract the target random RTD determined by the location server 970 and generate and apply a random timing compensation between the transmission of the first PRS (e.g., using the first feeder link 942) and the transmission of the second PRS (e.g., using the second feeder kink 944), as described above with respect to FIG. 9A.

In some examples, UE 910 can receive assistance data that includes an NR-RTD-Info (e.g., the RTD between first satellite 932 and second satellite 934) set equal to the target random RTD determined by gateway 920. UE 910 can use the NR-RTD-Info from the assistance data in combination with the measured time of arrival of the first PRS (e.g., from first satellite 932) and the second PRS (e.g., from second satellite 934) to determine a TDOA between the PRS pair. UE 910 can then use the determined TDOA between the PRS pair in combination with location information of first satellite 932 and second satellite 934 to perform UE-based positioning, without being able to derive a location of gateway 920. In one illustrative example, location server 970 (e.g., LMF) can signal the target random RTD to the UE 910 directly. For example, the location server 970 (e.g., LMF) can communicate assistance data with NR-RTD-Info=target random RTD (e.g., as determined by location server 970) to UE 910.

FIG. 10 is a flowchart illustrating an example of a process 1000 for wireless communications performed at a network entity. In some examples, the network entity can include a non-terrestrial network (NTN) gateway or a base station. For example, the network entity can include one or more of the gateway 720 illustrated in FIG. 7, the gateway 820 illustrated in FIG. 8, the gateway 920 illustrated in FIG. 9A, and/or the gateway 920 illustrated in FIG. 9B.

At block 1002, the process 1000 includes determining, at a network entity, a transmission timing compensation between a first reference signal and a second reference signal. For example, one or more of the first reference signal and the second reference signal can be a positioning reference signal (PRS). In some examples, one or more of the first reference signal and the second reference signal can be the same as or similar to one or more of the PRS beams $606_1$ to $606_8$ illustrated in the example of FIG. 6.

In some examples, determining the transmission timing compensation between the first reference signal and the second reference signal can include determining a relative propagation time difference between a first communication link used to transmit the first reference signal and a second communication link used to transmit the second reference signal. For example, the first communication link can include one or more of the feeder link 742 illustrated in FIG. 7, the feeder link 842 illustrated in FIG. 8, the feeder link 942 illustrated in FIG. 9A, and/or the feeder link 942 illustrated in FIG. 9B. The second communication link can include one or more of the feeder link 744 illustrated in FIG. 7, the feeder link 844 illustrated in FIG. 8, the feeder link 944 illustrated in FIG. 9A, and/or the feeder link 944 illustrated in FIG. 9B.

In some aspects, the relative propagation time difference between the first communication link and the second communication link can be determined in response to receiving a transmission timing full compensation request from an additional network entity. For example, the transmission timing full compensation request can be transmitted by an additional network entity comprising a location server or location management function (e.g., LMF) such as the location server 970 illustrated in FIGS. 9A and/or 9B; and the transmission timing full compensation request can be received by a network entity including a base station or a gateway. For example, the network entity can include one or more of the gateway 720 illustrated in FIG. 7, the gateway 820 illustrated in FIG. 8, the gateway 920 illustrated in FIG. 9A, and/or the gateway 920 illustrated in FIG. 9B.

In some examples, the process 1000 includes transmitting assistance data wherein the assistance data does not include relative time difference (RTD) information for the first reference signal and the second reference signal. In some examples, the assistance data includes RTD for the first reference signal and the second reference signal having a value of zero.

In some examples, the process 1000 includes determining a distance associated with the first communication link using a location of a first non-terrestrial network (NTN) transceiver associated with the first communication link. The process 1000 can further include determining a distance associated with the second communication link using a location of a second NTN transceiver associated with the second communication link. In some examples, the relative propagation time difference can be determined based on the distance associated with the first communication link and the distance associated with the second communication link. For example, the distance associated with the first communication link can be the distance (e.g., propagation distance) associated with one or more of the feeder link 742 illustrated in FIG. 7, the feeder link 842 illustrated in FIG. 8, the feeder link 942 illustrated in FIG. 9A, and/or the feeder link 942 illustrated in FIG. 9B. The distance associated with the second communication link can be the distance (e.g., propagation distance) associated with one or more of the feeder link 744 illustrated in FIG. 7, the feeder link 844 illustrated in FIG. 8, the feeder link 944 illustrated in FIG. 9A, and/or the feeder link 944 illustrated in FIG. 9B.

In some examples, the first NTN transceiver and the second NTN transceiver are satellites. For example, the first NTN transceiver can include one or more of the satellites 732 illustrated in FIG. 7, the satellite 832 illustrated in FIG. 8, the satellite 932 illustrated in FIG. 9A, and/or the satellite 932 illustrated in FIG. 9B. In some examples, the second NTN transceiver can include one or more of the satellites 734 illustrated in FIG. 7, the satellite 834 illustrated in FIG. 8, the satellite 934 illustrated in FIG. 9A, and/or the satellite 934 illustrated in FIG. 9B. In some aspects, one or more of the location of the first NTN transceiver and the location of the second NTN transceiver can be determined based on ephemeris information of the satellites.

In some examples, the process 1000 includes obtaining the target RTD between the first reference signal and the second reference signal by obtaining a target relative time difference (RTD) between the first reference signal and the second reference signal and determining the transmission timing compensation between the first reference signal and the second reference signal based on the target RTD. For example, obtaining the target RTD between the first reference signal and the second reference signal can include determining, at the network entity, a random RTD between the first reference signal and the second reference signal. In some aspects, the process 1000 includes determining, at the network entity, the random RTD between the first reference signal and the second reference signal in response to receiving a transmission timing partial compensation request. Based on receiving the transmission timing partial compensation request, the random RTD between the first reference signal and the second reference signal can be transmitted. In some examples, assistance data can be transmitted that includes the random RTD between the first reference signal and the second reference signal.

In some examples, obtaining the target RTD between the first reference signal and the second reference signal includes obtaining, at the network entity, a random RTD between the first reference signal and the second reference signal from an additional network entity. For example, the additional network entity can include a location server or location management function (e.g., LMF) such as the location server 970 illustrated in FIGS. 9A and/or 9B. In some aspects, the random RTD between the first reference signal and the second reference signal can be obtained in a transmission timing partial compensation request received from the additional network entity, such as the location server or location management function (e.g., LMF) such as the location server 970 illustrated in FIGS. 9A and/or 9B.

At block 1004, the process 1000 includes transmitting the first reference signal using a first communication link. For example, the first communication link can include one or more of the feeder link 742 illustrated in FIG. 7, the feeder link 842 illustrated in FIG. 8, the feeder link 942 illustrated in FIG. 9A, and/or the feeder link 942 illustrated in FIG. 9B. The first reference signal can be transmitted by or otherwise using one or more of the gateway 720 illustrated in FIG. 7, the gateway 820 illustrated in FIG. 8, the gateway 920 illustrated in FIG. 9A and/or the gateway 920 illustrated in FIG. 9B.

At block 1006, the process 1000 includes transmitting the second reference signal using a second communication link based on an offset determined based on the transmission timing compensation, wherein the offset offsets transmission of the second reference signal from transmission of the first reference signal. The second communication link can include one or more of the feeder link 744 illustrated in FIG. 7, the feeder link 844 illustrated in FIG. 8, the feeder link 944 illustrated in FIG. 9A, and/or the feeder link 944 illustrated in FIG. 9B.

In some examples, the processes described herein (e.g., process 1000 and/or any other process described herein) may be performed by a computing device, apparatus, or system. In one example, the process 1000 can be performed by a computing device or system having the computing device architecture 1100 of FIG. 11. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 1000 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1000 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 11 illustrates an example computing device architecture 1100 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 1100 are shown in electrical communication with each other using connection 1105, such as a bus. The example computing device architecture 1100 includes a processing unit (CPU or processor) 1110 and computing device connection 1105 that couples various computing device components including computing device memory 1115, such as read only memory (ROM) 1120 and random-access memory (RAM) 1125, to processor 1110.

Computing device architecture 1100 can include a cache of high-speed memory connected directly with, in close proximity to, or integrated as part of processor 1110. Computing device architecture 1100 can copy data from memory 1115 and/or the storage device 1130 to cache 1112 for quick access by processor 1110. In this way, the cache can provide a performance boost that avoids processor 1110 delays while waiting for data. These and other engines can control or be configured to control processor 1110 to perform various actions. Other computing device memory 1115 may be available for use as well. Memory 1115 can include multiple different types of memory with different performance characteristics. Processor 1110 can include any general-purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1000. Communication interface 1040 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules or engines are contemplated. Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for wireless communications performed at a network entity, comprising: determining, at the network entity, a transmission timing compensation between a first reference signal and a second reference signal; transmitting the first reference signal using a first communication link; and transmitting, based on an offset determined based on the transmission timing compensation, the second reference signal using a second communication link, wherein the offset offsets transmission of the second reference signal from transmission of the first reference signal.

Aspect 2: The method of Aspect 1, wherein at least one of the first reference signal and the second reference signal is a positioning reference signal (PRS).

Aspect 3: The method of any of Aspects 1 to 2, wherein determining the transmission timing compensation between the first reference signal and the second reference signal comprises: determining a relative propagation time difference between the first communication link and the second communication link.

Aspect 4: The method of Aspect 3, further comprising determining, at the network entity, the relative propagation time difference between the first communication link and the second communication link in response to receiving a transmission timing full compensation request from an additional network entity.

Aspect 5: The method of Aspect 4, wherein the network entity is a base station or a gateway and the additional network entity is a location server.

Aspect 6: The method of any of Aspects 3 to 5, further comprising: determining a distance associated with the first communication link using a location of a first non-terrestrial network (NTN) transceiver associated with the first communication link; determining a distance associated with the second communication link using a location of a second NTN transceiver associated with the second communication link; and determining the relative propagation time difference based on the distance associated with the first communication link and the distance associated with the second communication link.

Aspect 7: The method of Aspect 6, wherein: the first NTN transceiver and the second NTN transceiver are satellites; and one or more of the location of the first NTN transceiver and the location of the second NTN transceiver is determined based on ephemeris information of the satellites.

Aspect 8: The method of any of any of Aspects 4 to 7, further comprising transmitting assistance data, wherein: the assistance data does not include relative time difference (RTD) information for the first reference signal and the second reference signal; or the assistance data includes RTD information for the first reference signal and the second reference signal having a value of zero.

Aspect 9: The method of any of Aspects 1 to 8, wherein determining the transmission timing compensation between the first reference signal and the second reference signal comprises: obtaining a target relative time difference (RTD) between the first reference signal and the second reference signal; and determining the transmission timing compensation between the first reference signal and the second reference signal based on the target RTD.

Aspect 10: The method of Aspect 9, wherein obtaining the target RTD between the first reference signal and the second reference signal comprises: determining, at the network entity, a random RTD between the first reference signal and the second reference signal.

Aspect 11: The method of Aspect 10, further comprising: determining, at the network entity, the random RTD between the first reference signal and the second reference signal in response to receiving a transmission timing partial compensation request; and transmitting the random RTD between the first reference signal and the second reference signal.

Aspect 12: The method of any of Aspects 10 to 11, further comprising: transmitting assistance data including the random RTD between the first reference signal and the second reference signal.

Aspect 13: The method of any of Aspects 9 to 12, wherein obtaining the target RTD between the first reference signal and the second reference signal comprises: obtaining, at the network entity, a random RTD between the first reference signal and the second reference signal from an additional network entity.

Aspect 14: The method of Aspect 13, wherein the random RTD between the first reference signal and the second reference signal is obtained in a transmission timing partial compensation request received from the additional network entity.

Aspect 15: The method of any of Aspects 1 to 14, wherein the network entity comprises a non-terrestrial network (NTN) gateway or a base station.

Aspect 16: An apparatus for wireless communications, the apparatus comprising: at least one transceiver; at least one memory; and at least one processor coupled to the at least one transceiver and the at least one memory and configured to: determine, at a network entity, a transmission timing compensation between a first reference signal and a second reference signal; transmit the first reference signal using a first communication link; and transmit, based on an offset determined based on the transmission timing compensation, the second reference signal using a second communication link, wherein the offset offsets transmission of the second reference signal from transmission of the first reference signal.

Aspect 17: The apparatus of Aspect 16, wherein at least one of the first reference signal and the second reference signal is a positioning reference signal (PRS).

Aspect 18: The apparatus of any of Aspects 16 to 17, wherein, to determine the transmission timing compensation between the first reference signal and the second reference signal, the at least one processor is configured to: determine a relative propagation time difference between the first communication link and the second communication link.

Aspect 19: The apparatus of Aspect 18, wherein the at least one processor is configured to: determine, at the network entity, the relative propagation time difference between the first communication link and the second communication link in response to receiving a transmission timing full compensation request from an additional network entity.

Aspect 20: The apparatus of Aspect 19, wherein the network entity is a base station or a gateway and the additional network entity is a location server.

Aspect 21: The apparatus of any of Aspects 18 to 20, wherein the at least one processor is configured to: determine a distance associated with the first communication link using a location of a first non-terrestrial network (NTN) transceiver associated with the first communication link; determine a distance associated with the second communication link using a location of a second NTN transceiver associated with the second communication link; and determine the relative propagation time difference based on the distance associated with the first communication link and the distance associated with the second communication link.

Aspect 22: The apparatus of Aspect 21, wherein: the first NTN transceiver and the second NTN transceiver are satellites; and one or more of the location of the first NTN transceiver and the location of the second NTN transceiver is determined based on ephemeris information of the satellites.

Aspect 23: The apparatus of any of Aspects 19 to 22, wherein the at least one processor is configured to transmit assistance data, wherein: the assistance data does not include relative time difference (RTD) information for the first reference signal and the second reference signal; or the assistance data includes RTD information for the first reference signal and the second reference signal having a value of zero.

Aspect 24: The apparatus of any of Aspects 16 to 23, wherein, to determine the transmission timing compensation between the first reference signal and the second reference signal, the at least one processor is configured to: obtain a target relative time difference (RTD) between the first reference signal and the second reference signal; and determine the transmission timing compensation between the first reference signal and the second reference signal based on the target RTD.

Aspect 25: The apparatus of Aspect 24, wherein, to obtain the target RTD between the first reference signal and the second reference signal, the at least one processor is configured to: determine, at the network entity, a random RTD between the first reference signal and the second reference signal.

Aspect 26: The apparatus of Aspect 25, wherein the at least one processor is configured to: determine, at the network entity, the random RTD between the first reference signal and the second reference signal in response to receiving a transmission timing partial compensation request; and transmit the random RTD between the first reference signal and the second reference signal.

Aspect 27: The apparatus of any of Aspects 25 to 26, wherein the at least one processor is configured to: transmit assistance data including the random RTD between the first reference signal and the second reference signal.

Aspect 28: The apparatus of any of Aspects 24 to 27, wherein, to obtain the target RTD between the first reference signal and the second reference signal, the at least one processor is configured to: obtain, at the network entity, a random RTD between the first reference signal and the second reference signal from an additional network entity.

Aspect 29: The apparatus of Aspect 28, wherein the at least one processor is configured to: obtain the random RTD between the first reference signal and the second reference signal in a transmission timing partial compensation request received from the additional network entity.

Aspect 30: The apparatus of any of Aspects 16 to 29, wherein the network entity comprises a non-terrestrial network (NTN) gateway or a base station.

Aspect 31: A non-transitory computer-readable storage medium having stored thereon instructions which, when executed by one or more processors, cause the one or more processors to perform any of the operations of Aspects 1 to 30.

Aspect 32: An apparatus comprising means for performing any of the operations of Aspects 1 to 30.

What is claimed is:

1. A method for wireless communications performed at a network entity, comprising:
determining, at the network entity, a transmission timing compensation between a first reference signal for a first non-terrestrial network (NTN) transceiver and a second reference signal for a second NTN transceiver, wherein the transmission timing compensation is determined based on a target relative time difference (RTD) comprising a random RTD between the first reference signal and the second reference signal, and wherein the random RTD is obtained in a transmission timing partial pre-compensation request received at the network entity from an additional network entity;
transmitting the first reference signal using a first communication link to the first NTN transceiver for re-transmission to a user equipment (UE); and
transmitting, based on an offset determined based on the transmission timing compensation, the second reference signal using a second communication link to the second NTN transceiver for re-transmission to the UE, wherein the offset offsets transmission of the second reference signal from transmission of the first reference signal by a duration corresponding to the transmission timing compensation.

2. The method of claim 1, wherein at least one of the first reference signal and the second reference signal is a positioning reference signal (PRS).

3. The method of claim 1, wherein determining the transmission timing compensation between the first reference signal and the second reference signal comprises:
determining a relative propagation time difference between the first communication link and the second communication link.

4. The method of claim 3, further comprising determining, at the network entity, the relative propagation time difference between the first communication link and the second communication link in response to receiving a transmission timing full compensation request from the additional network entity.

5. The method of claim 4, wherein the network entity is a base station or a gateway and the additional network entity is a location server.

6. The method of claim 3, further comprising:
determining a distance associated with the first communication link using a location of the first NTN transceiver associated with the first communication link;
determining a distance associated with the second communication link using a location of the second NTN transceiver associated with the second communication link; and
determining the relative propagation time difference based on the distance associated with the first communication link and the distance associated with the second communication link.

7. The method of claim 6, wherein:
the first NTN transceiver and the second NTN transceiver are satellites; and
at least one of the location of the first NTN transceiver or the location of the second NTN transceiver is determined based on ephemeris information of the satellites.

8. The method of claim 4, further comprising transmitting assistance data, wherein:
the assistance data does not include relative time difference (RTD) information for the first reference signal and the second reference signal; or
the assistance data includes RTD information for the first reference signal and the second reference signal having a value of zero.

9. The method of claim 1, wherein determining the transmission timing compensation between the first reference signal and the second reference signal comprises:

obtaining the target RTD between the first reference signal and the second reference signal; and determining the transmission timing compensation between the first reference signal and the second reference signal based on the target RTD.

10. The method of claim 9, wherein obtaining the target RTD between the first reference signal and the second reference signal comprises:

receiving, at the network entity, the transmission timing partial pre-compensation request from the additional network entity; and determining, at the network entity, the random RTD between the first reference signal and the second reference signal, wherein the transmission timing partial pre-compensation request causes the network entity to determine the random RTD.

11. The method of claim 10, further comprising:

transmitting the random RTD between the first reference signal and the second reference signal.

12. The method of claim 10, further comprising:

transmitting assistance data including the random RTD between the first reference signal and the second reference signal.

13. The method of claim 1, wherein the network entity comprises a non-terrestrial network (NTN) gateway or a base station.

14. An apparatus for wireless communications, the apparatus comprising:

at least one memory; and at least one processor coupled to the at least one memory and configured to:

determine, at a network entity, a transmission timing compensation between a first reference signal for a first non-terrestrial network (NTN) transceiver and a second reference signal for a second NTN transceiver, wherein the transmission timing compensation is determined based on a target relative time difference (RTD) comprising a random RTD between the first reference signal and the second reference signal, and wherein the random RTD is obtained in a transmission timing partial pre-compensation request received at the network entity from an additional network entity;

transmit the first reference signal using a first communication link to the first NTN transceiver for re-transmission to a user equipment (UE); and transmit, based on an offset determined based on the transmission timing compensation, the second reference signal using a second communication link to the second NTN transceiver for re-transmission to the UE, wherein the offset offsets transmission of the second reference signal from transmission of the first reference signal by a duration corresponding to the transmission timing compensation.

15. The apparatus of claim 14, wherein at least one of the first reference signal and the second reference signal is a positioning reference signal (PRS).

16. The apparatus of claim 14, wherein, to determine the transmission timing compensation between the first reference signal and the second reference signal, the at least one processor is configured to:

determine a relative propagation time difference between the first communication link and the second communication link.

17. The apparatus of claim 16, wherein the at least one processor is configured to:

determine, at the network entity, the relative propagation time difference between the first communication link and the second communication link in response to receiving a transmission timing full compensation request from the additional network entity.

18. The apparatus of claim 17, wherein the network entity is a base station or a gateway and the additional network entity is a location server.

19. The apparatus of claim 16, wherein the at least one processor is configured to:

determine a distance associated with the first communication link using a location of the first NTN transceiver associated with the first communication link;

determine a distance associated with the second communication link using a location of the second NTN transceiver associated with the second communication link; and determine the relative propagation time difference based on the distance associated with the first communication link and the distance associated with the second communication link.

20. The apparatus of claim 19, wherein:

the first NTN transceiver and the second NTN transceiver are satellites; and at least one of the location of the first NTN transceiver or the location of the second NTN transceiver is determined based on ephemeris information of the satellites.

21. The apparatus of claim 17, wherein the at least one processor is configured to transmit assistance data, wherein:

the assistance data does not include relative time difference (RTD) information for the first reference signal and the second reference signal; or the assistance data includes RTD information for the first reference signal and the second reference signal having a value of zero.

22. The apparatus of claim 14, wherein, to determine the transmission timing compensation between the first reference signal and the second reference signal, the at least one processor is configured to:

obtain the target RTD between the first reference signal and the second reference signal; and determine the transmission timing compensation between the first reference signal and the second reference signal based on the target RTD.

23. The apparatus of claim 22, wherein, to obtain the target RTD between the first reference signal and the second reference signal, the at least one processor is configured to:

receive, at the network entity, the transmission timing partial pre-compensation request from the additional network entity; and determine, at the network entity, the random RTD between the first reference signal and the second reference signal, wherein the transmission timing partial pre-compensation request causes the network entity to determine the random RTD.

24. The apparatus of claim 23, wherein the at least one processor is configured to:

transmit the random RTD between the first reference signal and the second reference signal.

25. The apparatus of claim 23, wherein the at least one processor is configured to:

transmit assistance data including the random RTD between the first reference signal and the second reference signal.

26. The apparatus of claim 14, wherein the network entity comprises a non-terrestrial network (NTN) gateway or a base station.

* * * * *